United States Patent
Inami

(10) Patent No.: US 8,638,305 B2
(45) Date of Patent: Jan. 28, 2014

(54) INFORMATION DEVICE

(75) Inventor: Akiko Inami, Gifu (JP)

(73) Assignee: KYOCERA Corporation, Kyoto (JP)

( * ) Notice: Subject to any disclaimer, the term of this patent is extended or adjusted under 35 U.S.C. 154(b) by 344 days.

(21) Appl. No.: 12/841,904

(22) Filed: Jul. 22, 2010

(65) Prior Publication Data

US 2011/0025626 A1 Feb. 3, 2011

(30) Foreign Application Priority Data

Jul. 29, 2009 (JP) ................................. 2009-176984

(51) Int. Cl.
*G06F 3/041* (2006.01)
*G05B 19/00* (2006.01)

(52) U.S. Cl.
USPC .......................................... 345/173; 340/5.83

(58) Field of Classification Search
USPC ........................................................ 345/173
See application file for complete search history.

(56) References Cited

U.S. PATENT DOCUMENTS

| | | | | |
|---|---|---|---|---|
| 5,943,043 | A * | 8/1999 | Furuhata et al. | 345/173 |
| 6,507,662 | B1 * | 1/2003 | Brooks | 382/115 |
| 2003/0096650 | A1 * | 5/2003 | Eguchi et al. | 463/41 |
| 2003/0122787 | A1 * | 7/2003 | Zimmerman et al. | 345/173 |
| 2003/0228883 | A1 * | 12/2003 | Kusakari et al. | 455/550.1 |
| 2004/0239648 | A1 * | 12/2004 | Abdallah et al. | 345/173 |
| 2006/0090084 | A1 * | 4/2006 | Buer | 713/189 |
| 2008/0034217 | A1 * | 2/2008 | McQuaide | 713/186 |
| 2008/0113650 | A1 * | 5/2008 | Engstrom | 455/411 |
| 2009/0165145 | A1 * | 6/2009 | Haapsaari et al. | 726/28 |
| 2012/0023573 | A1 * | 1/2012 | Shi | 726/17 |

FOREIGN PATENT DOCUMENTS

| | | |
|---|---|---|
| JP | 2002-344611 | 11/2002 |
| JP | 2009-054118 | 3/2009 |

* cited by examiner

*Primary Examiner* — Alexander S Beck
*Assistant Examiner* — Mihir Rayan
(74) *Attorney, Agent, or Firm* — Procopio, Cory, Hargreaves & Savitch LLP

(57) ABSTRACT

A method for executing an application program is disclosed. One or more icons are displayed on a touch panel. If a user's fingerprint is authenticated on the touch panel, an application program is given access to designated personal information. The application program is then executed using the designated personal information, if the detected action is an information-designated start operation.

21 Claims, 32 Drawing Sheets

Figure 5

| Name | ... | Phone 1 | Phone | ... | Email 1 | Email 2 | URL | ... | Fingerprint |
|---|---|---|---|---|---|---|---|---|---|
| Susie | ... | 0123456666 | ... | ... | aa@bb.cc.dd | ... | http://www.aa.bb.cc/dd | ... | Fingerprint A |
| Tom | ... | 0123457777 | ... | ... | ee@ff.gg.hh | ... | http://www.ee.ff.gg/hh | ... | Fingerprint B |
| ... | ... | ... | ... | ... | ... | ... | ... | ... | ... |

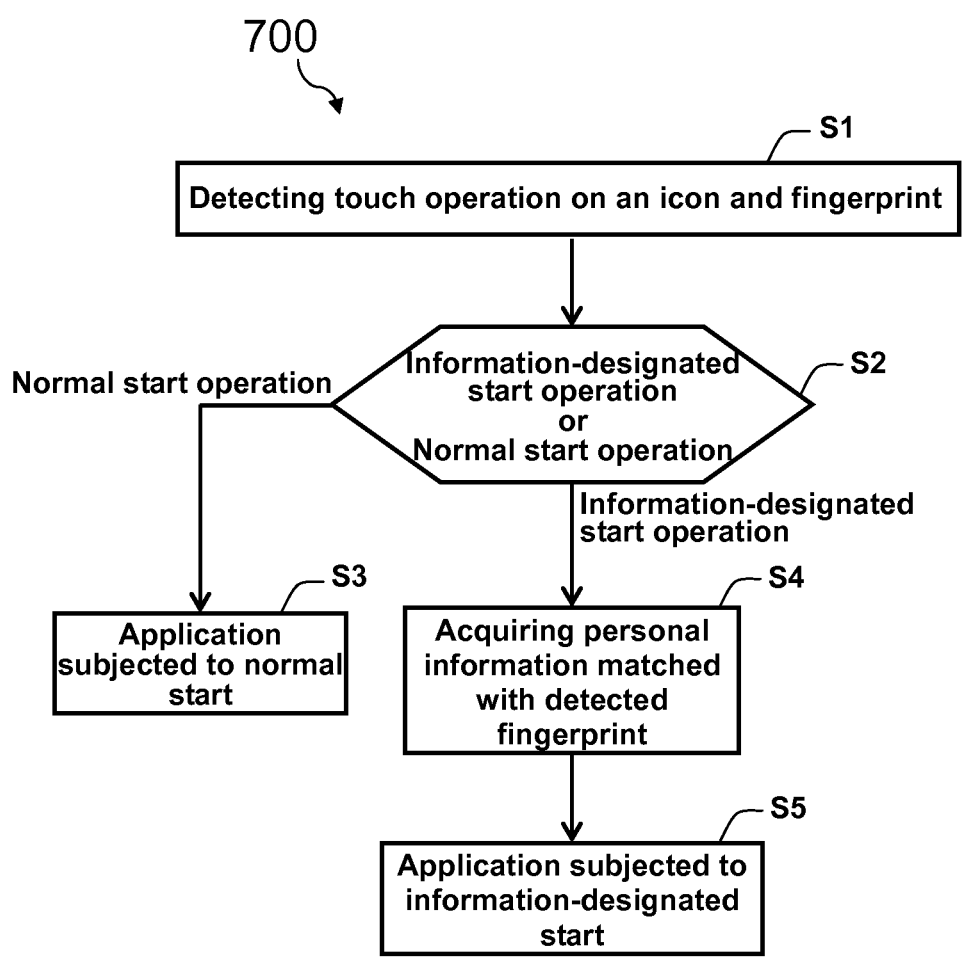

Figure 30

Address book registration — 210

- Name — 210a
- Reading — 210b
- Phone 1 — 210c
- Phone 2 — 210d
- Phone 3 — 210e
- Email 1 — 210f
- Email 2 — 210g
- Email 3 — 210h
- URL — 210i
- Addres — 210j
- Birth Date — 210k
- Blood type — 210l Return — 210m
Register — 210n

INFORMATION DEVICE

CROSS-REFERENCE TO RELATED APPLICATION

The present application claims priority under 35 U.S.C. §119 to Japanese Patent Application No. 2009-176984, filed on Jul. 29, 2009, entitled "INFORMATION PROCESSING DEVICE AND METHOD OF STARTING APPLICATION PROGRAM". The content of which is incorporated by reference herein in its entirety.

FIELD

Embodiments of the present disclosure relate generally to information devices, and more particularly relate to information devices operable to activate an application program via a touch screen.

BACKGROUND

Mobile phones may comprise a touch screen. Such a touch screen may be used to activate application programs, information, and/or data. When such application programs, information, and/or data is personal, private, and secure, it would be prudent to protect access via an access control mechanism.

SUMMARY

A method for executing an application program is disclosed. One or more icons are displayed on a touch panel. If a user's fingerprint is detected on the touch panel, an application program is given access to designated personal information. Then, the application program is executed using the designated personal information, if the detected action is information-designated start operation.

A first embodiment comprises an information device. The information device comprises a storage module, a touch panel, and a control module. The storage module comprises one or more fingerprints corresponding to one or more fingers of a user respectively, and designated information associated with each of the fingerprints respectively. The touch panel is operable to display one or more icons, detect fingerprint information from a finger touching the touch panel to obtain a detected fingerprint information, and detect an action of the finger touching a selected icon. The control module is operable to authenticate the detected fingerprint information, if the detected fingerprint information is associated with the designated information, and execute an application program corresponding to the selected icon using the designated information to obtain a designated execution, if the detected fingerprint is authenticated and if the action is an information-designated start operation.

A second embodiment comprises a method for operating an information device. The method comprises obtaining fingerprint information from a user finger touching a touch panel, and authenticating the fingerprint information, if the fingerprint information is associated with designated information stored in the information device. The method further comprises detecting an information-designated start operation of the user finger touching a selected program icon displayed on the touch panel, and executing an application program corresponding to the selected program icon using the designated information, if the fingerprint information is authenticated.

A third embodiment comprises a computer readable medium comprising program code for operating an information device. The program code comprises obtaining fingerprint information from a user finger touching a touch panel, and authenticating the fingerprint information, if the fingerprint information is associated with designated information stored in the information device. The program code further comprises detecting an information-designated start operation of the user finger touching a selected program icon displayed on the touch panel, and executing an application program corresponding to the selected program icon using the designated information, if the fingerprint information is authenticated.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

FIG. 5 is an illustration of an exemplary address book file according to an embodiment of the disclosure.

FIG. 7A is an illustration of an exemplary flowchart showing a method of starting an application other than the address book management program in a mobile phone according to an embodiment of the disclosure.

FIG. 30 is an illustration of an exemplary address-book registration screen according to an embodiment of the disclosure.

DETAILED DESCRIPTION

Figure 1:
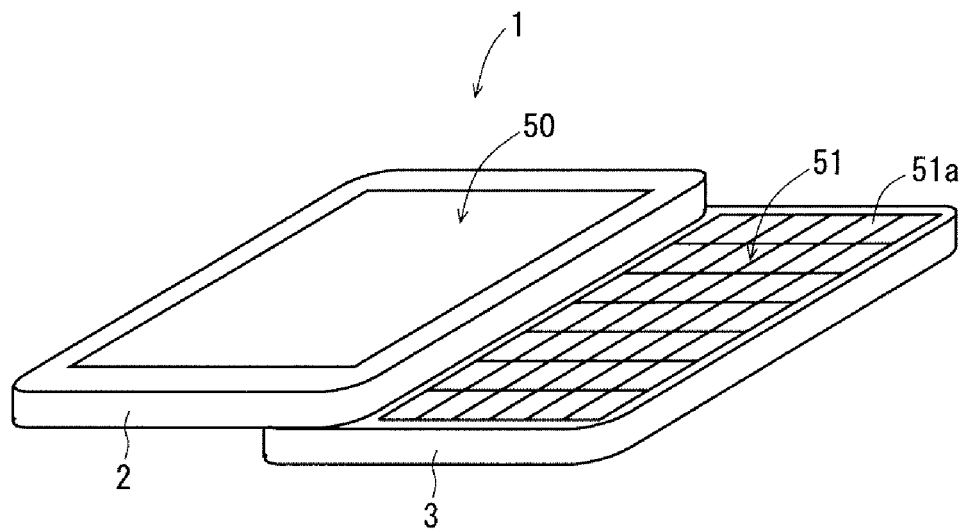
FIG. 1 is an illustration of an open state of an exemplary mobile phone as an information device according to an embodiment of the present disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure are described herein in the context of one practical non-limiting application, namely, an information device. Embodiments of the disclosure, however, are not limited to such mobile information devices, and the techniques described herein may also be utilized in other applications. For example, embodiments may be applicable to mobile phones, digital books, digital cameras, electronic game machines, digital music players, personal digital assistance (PDA), personal handy phone system (PHS), lap top computers, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

A mobile phone can comprise a push button switch capable of detecting a human fingerprint. The fingerprint can be detected by the push button switch, in response to a user pressing the push button switch. If the detected fingerprint is pre-registered in the mobile phone, a connection can be made from the mobile phone to a communication destination specified by communication-destination data matched to the pre-registered fingerprint. The communication-destination data may comprise a telephone number, an email address, and the like. A touch panel can also detect the fingerprint in response to a touch by a human finger.

In an information processor, a user's usability can be enhanced, if the user can choose whether to start an application program in a designated state or in a non-designated state. In the designated state personal information of the user is designated as information to be used, and in the non-designated state the personal information of the user is not designated as information to be used. The personal information may comprise a telephone number, an email address, and the like, matched to the detected fingerprint.

Figure 2:
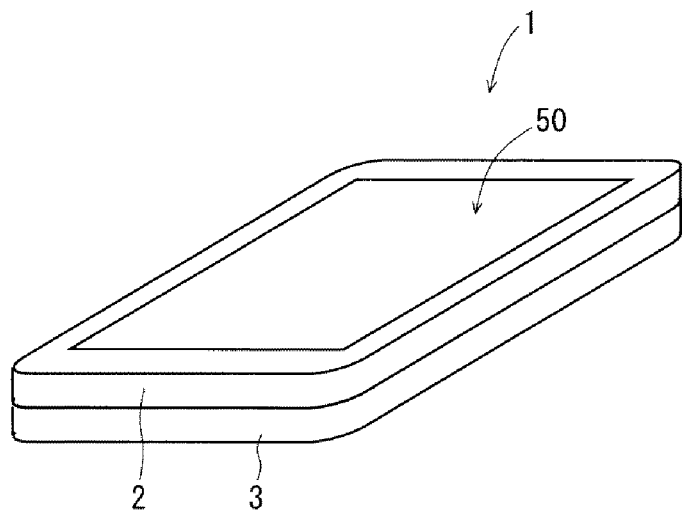
FIG. 2 is an illustration of a closed state of the exemplary mobile phone shown FIG. 1.

FIG. 1 is an illustration an information device such as a mobile phone 1 according to an embodiment of the disclosure. FIG. 2 is an illustration of a closed state of the mobile phone shown in FIG. 1. The mobile phone 1 may be, for example but without limitation, a sliding type in which a first chassis 2 and a second chassis 3 can slide in one direction from a state where the first chassis 2 and the second chassis 3 are overlapped; a folding type comprising: a first chassis (manipulation-side chassis); a second chassis (display-side chassis) and a coupling portion; a turning type in which one of the chassis 2/3 is made to turn around an axis line along an overlapping direction of a first chassis and a second chassis; a straight type in which the first chassis and the second chassis are arranged in one chassis having no coupling portion, and the like.

The mobile phone 1 comprises a first chassis 2 and a second chassis 3. The first chassis 2 and the second chassis 3 are coupled by a coupling portion (not shown). The first chassis 2 and the second chassis 3 may each have a plate-shape. The first chassis 2 may comprise a touch panel 50 thereon and the second chassis 3 may comprise a key manipulation module comprising manipulation key switches 51a thereon.

The first chassis 2 and the second chassis 3 both have a plate shape, where the touch panel 50 may be housed in the first chassis 2, and an operation module 51 comprising the manipulation key switches 51a may be housed in the second chassis 3.

The mobile phone 1 shown in FIG. 1 is a sliding-type mobile phone in which the first chassis 2 housing the touch panel 50 is slidable. The mobile phone 1 may also be a folding type capable of folding the first chassis 2 and the second chassis 3 so that the display surface of the touch panel 50 and the manipulation key switches 51a face each other. The mobile phone 1 may not change the positional relation of the first chassis 2 and the second chassis 3 in a state in which the first chassis 2 and the second chassis 3 are arranged above and below each other respectively.

The mobile phone 1 comprises two states: an open state in which the first chassis 2 and the second chassis 3 are partially overlapped so that the manipulation key switches 51a can be viewable from outside; and a closed state in which a main face of the first chassis 2 and a main face of the second chassis 3 are substantially completely overlapped so that the manipulation the key switches 51a cannot be viewable from the outside. The user can change the state of the mobile phone 1 to the open state (FIG. 1) or to the closed state (FIG. 2) by sliding the first chassis 2 along the main face accordingly.

In an embodiment, a state-detecting module detects whether the mobile phone 1 is in the open state (FIG. 1) or the closed state (FIG. 2). A fingerprint detection of the touch panel 50 and detection of an information-designated start operation is effective, if the state-detecting module detects that the mobile phone 1 is in the closed state.

Figure 3:
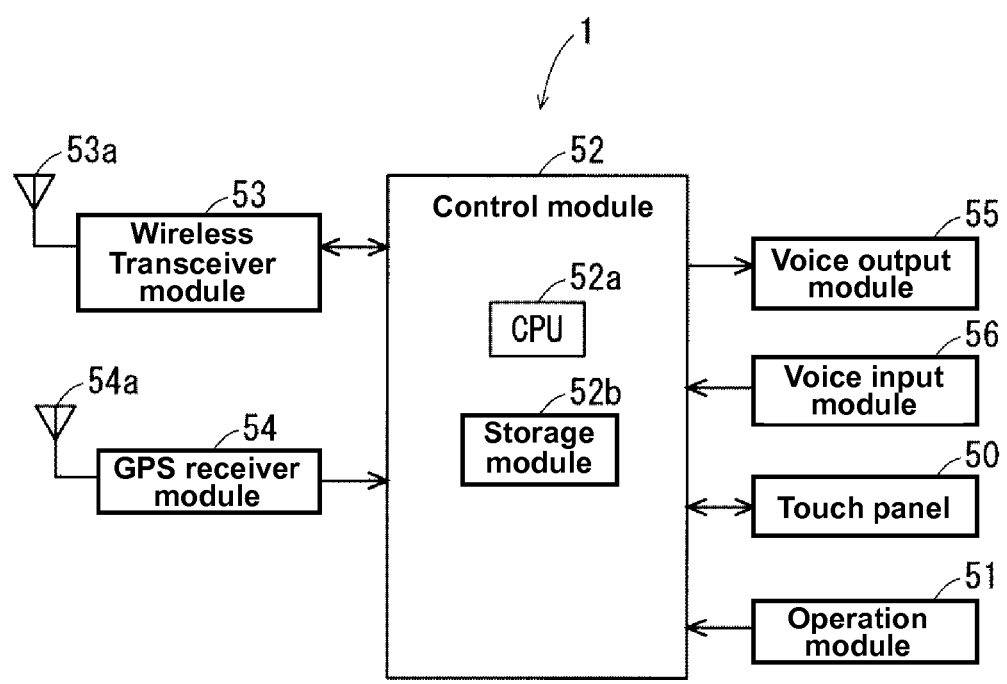
FIG. 3 is an illustration of a schematic functional block diagram of an exemplary mobile phone according to an embodiment of the disclosure.

FIG. 3 is an illustration of an exemplary schematic functional block diagram of the mobile phone 1 according to an embodiment of the disclosure. The mobile phone 1 comprises a control module 52, a wireless transceiver module 53, an antenna 53a, a GPS receiver module 54, an antenna 54a, a voice output module 55, a voice input module 56, the touch panel 50, and an operation module 51. The control module 52, the wireless transceiver module 53, the GPS receiver module 54, the voice output module 55, and the voice input module 56 may be housed in the second chassis 3.

The control module 52 comprises a computer CPU 52a and a storage module 52b. The control module 52 may comprise transmission/reception of signals at the wireless transceiver module 53. The control module 52 controls overall operation of the mobile phone 1. For example, the control module 52 may control operations of the mobile phone 1 so that processes of the mobile phone 1 are suitably performed such that various processing are performed by proper procedures in response to manipulation of the operation module 51. These processes comprise, for example but without limitation, call-processing, email-processing, browser-processing, navigation processing, map display processing, schedule management processing, an address book management processing; an audio processing, touch panel control, fingerprint data processing in performing the fingerprint authentication, personal information acquiring, determining operational content, and the like. The control module 52 also controls a communication of the wireless transceiver module 53, and access to the storage module 52b such as access to the fingerprint data, and the like. For example, the control module 52 can control the wireless transceiver module 53 to process a telephone call or an electronic mail. For another example, the control module 52 can control the touch panel 50 to detect an action or an operation of a finger of a user, detect a fingerprint, display various kinds of information, such as an icon for starting an application program or letters. The control module 52 is explained in more detail in the context of discussion of FIG. 6 below.

The control module 52 may comprise the computer CPU 52a (microprocessor) or another processor for performing a process based on a program (operating system, application program, etc.) stored in the storage module 52b. The control module 52 may read instruction code sequentially from programs such as the operating system and the application program, which are stored in the storage module 52b, and perform the programs. For example, a fingerprint authentication method in the control module 52 may be realized on the computer by one or a plurality of programs, or may be at least partially realized by hardware. For another example, the control module 52 can execute various application programs using a designated execution or a normal execution process as explained in more detail below.

The storage module 52b is operable to store various kinds of data used for various processes of the mobile phone 1. In practical embodiments, the storage module 52b may comprise, for example but without limitation, a non-volatile storage device (non-volatile semiconductor memory, hard disk device, optical disk device, and the like), a random access storage device (for example, SRAM, DRAM), or any other form of storage medium known in the art. The storage module 52b may store a plurality of application programs such as: a call program, an email program, a browser program, a navigation program, a map display program, a schedule management program, an address book management program for managing personal information such as a telephone number and e-mail address of a communication party; an audio file for reproducing a ring tone and alarm tone, an image file for a standby screen, a temporary data used in a program process, reference fingerprint data used in performing the fingerprint authentication, personal information, a schedule book, a computer program which is executed by the control module 52, an operating system (OS), tentative data used in executing a program processing, and the like. The storage module 52b may be coupled to the control module 52 such that the control module 52 can read information from and write information to storage module 52b as explained in more detail in the context of discussion of FIG. 6 below. As an example, the control module 52 and storage module 52b may reside in their respective ASICs. The storage module 52b may also be integrated into the control module 52. In an embodiment, the storage module 52b may comprise a cache memory for storing temporary variables or other intermediate information during execution of instructions to be executed by the control module 52. The storage module 52b may also comprise non-volatile memory for storing instructions to be executed by the control module 52. The storage module 52b is explained in more detail in the context of discussion of FIG. 4 below.

The mobile phone 1 is operable to transmit and receive a plurality of communication signals comprising data signals via the wireless transceiver module 53. The wireless transceiver module 53 modulates a transmitting signal from the control module 52 as a radio signal to a base station (not shown) through the antenna 53a, and demodulates a radio signal received from the base station through the antenna 53a. The radio signal may comprise data from a communication device such as a server device communicatively coupled to the Internet via the antenna 53a. The control module 52 receives the demodulated signal from the wireless transceiver module 53. The wireless transceiver module 53 is also operable to carry out a radio communication with a network side device via a mobile communication network (not shown) such as the base station communicatively coupled to the mobile communication network (not shown). In this manner, the wireless transceiver module 53 may transmit signals generated in the control module 52, via the antenna 53a, to a base station, and thereby to, for example but without limitation, the Internet, a different mobile phone, a communication device, and the like. The wireless transceiver module 53 communicates with a base station transceiver via a wireless data communication link (not shown). The wireless transceiver module 53 cooperates with the base station transceiver with a suitably configured RF antenna arrangement such as the antenna 53a that can support a particular wireless communication protocol and modulation scheme. The data signals may comprise, for example but without limitation, voice data during voice communication, text data during email, and web data during accessing web site.

The antenna 53a-54a may be, for example and without limitation, a built-in antenna, a rod antenna, and the like. The antenna 53a is configured to transmit and receive electromagnetic waves at a predetermined frequency band to and from the base station respectively.

The GPS receiver module 54 receives GPS signals transmitted from a GPS satellite via the antenna 54a. The GPS receiver module 54 calculates a current location of the mobile phone 1 based on the received GPS signals and outputs same to the control module 52.

The voice output module 55 comprises a speaker (not shown) and outputs a digital voice data supplied from the control module 52. The voice output module 55 applies a signal processing to the digital voice data supplied from the control module 52. In this manner, the voice output module 55 performs decoding, digital/analog conversion, and amplification to convert the digital voice data to an analog voice signal for output to the speaker.

The voice input module 56 comprises a microphone (not shown) and outputs an encoded digital voice for input to the control module 52, by converting an analog voice input received by the microphone from outside. In this manner, the voice input module 56 amplifies the analog voice input from the microphone, and carries out an analog/digital conversion to obtain a digital voice input. The voice input module 56 applies a signal processing such as an encoding, or the like, to the digital voice input to obtain an encoded digital voice input, and sends the encoded digital voice input to the control module 52.

Various kinds of information such as an icon for starting an application program or letters can be displayed on the display screen of the touch panel 50 via an image/video signal supplied from the control module 52. Furthermore, the touch panel 50 detects the operations of a finger of a user on a display screen and outputs same to the control module 52. Moreover, the touch panel 50 detects the fingerprint of the user's finger that has touched the display screen and outputs same to the control module 52. The touch panel 50 may comprise a scanner function using a photodetector element, or a capacitance-type touch panel. The touch panel 50 may be formed by, for example but without limitation, a liquid crystal (LCD) panel, an organic electro-luminescence (OEL) panel, and the like.

As described above, the operation module 51 comprises the manipulation key switches 51a, detects a pressing/activation operation by the user using each of the manipulation key switches 51a, and outputs the result to the control module 52. The manipulation key switches 51a may comprise a plurality of keys, such as but without limitation, a power key, a telephone call key, numeric keys, character keys, arrow keys or direction keys, a determination key, a transmission key, and like to which various functions can be allocated.

Figure 4:
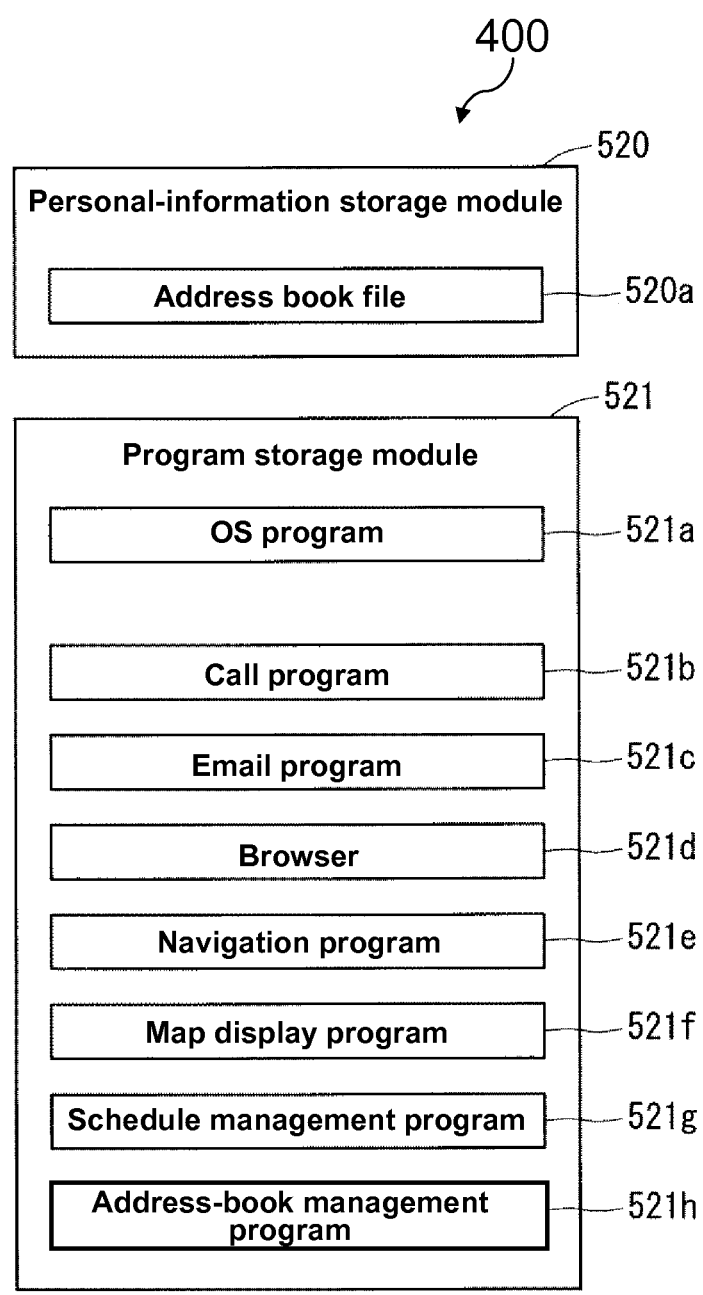
FIG. 4 is an illustration of an exemplary schematic functional block diagram of a storage module of a mobile phone according to an embodiment of the disclosure.

FIG. 4 is an illustration of an exemplary schematic functional block diagram of a storage module 400 (52b in FIG. 3) of the mobile phone 1. The storage module 400 comprises a personal-information storage module 520 for storing personal information and a program storage module 521 for storing various kinds of programs.

The personal-information storage module 520 stores an address book file 520a comprising personal information as explained in more detail below in context of discussion of FIG. 5.

Furthermore, a fingerprint of a user of the mobile phone 1 detected on the touch panel 50 is registered in the address book file 520a using at least one of the records 520aa (FIG. 5). In this manner, the personal information and the user's fingerprint can be matched (authenticated) and stored in at least one of the records 520aa (FIG. 5). A plurality of fingerprints that are different from each other can be registered in the address book file 520a, and the same fingerprint cannot be registered more than once.

In one embodiment, a plurality of fingerprints and personal information of a plurality of persons can be registered in the address book file 520a by matching personal information of each of the persons to each of the fingerprints respectively. The method of registering fingerprints using the address book file 520a is described in detail below.

The program storage module 521 stores an operating system (OS) program 521a and a plurality of application programs (hereinafter simply referred to as "applications"). The applications may comprise, for example but without limitation, a call program 521b, an email program 521c, a browser 521d, a navigation program 521e, a map display program 521f, a schedule management program 521g, an address book management program 521h, and the like.

Using the call program 521b, a user can talk to another mobile phone user. The email program 521c exchanges emails between the mobile phone 1 and another mobile phone or a communication device communicatively coupled to the Internet. The browser 521d displays, on the touch panel 50, websites provided by a server device (communication device) communicatively coupled to the Internet. The navigation program 521e conducts route guidance for the user of the mobile phone 1 using a map. The map display program 521f displays a map on the touch panel 50. The schedule management program 521g manages a schedule that is created by the mobile phone 1. The address book management program 521h manages the address book file 520a.

The CPU 52a (FIG. 3) executes the OS program 521a stored in the storage module 52b and various kinds of applications so that a plurality of functional blocks are realized in the control module 52 as explained in more detail in the context of discussion of FIG. 6 below.

FIG. 5 is an illustration of an exemplary address book file 500 (520a in FIG. 4). The address book file 520a has a table format and personal information of each person is recorded in each of the records 520aa of the address book file 520a. The personal information recorded in the records 520aa may comprise, for example but without limitation, name, telephone numbers of a plurality of types, email addresses of various types, a URL, and the like.

Figure 6:
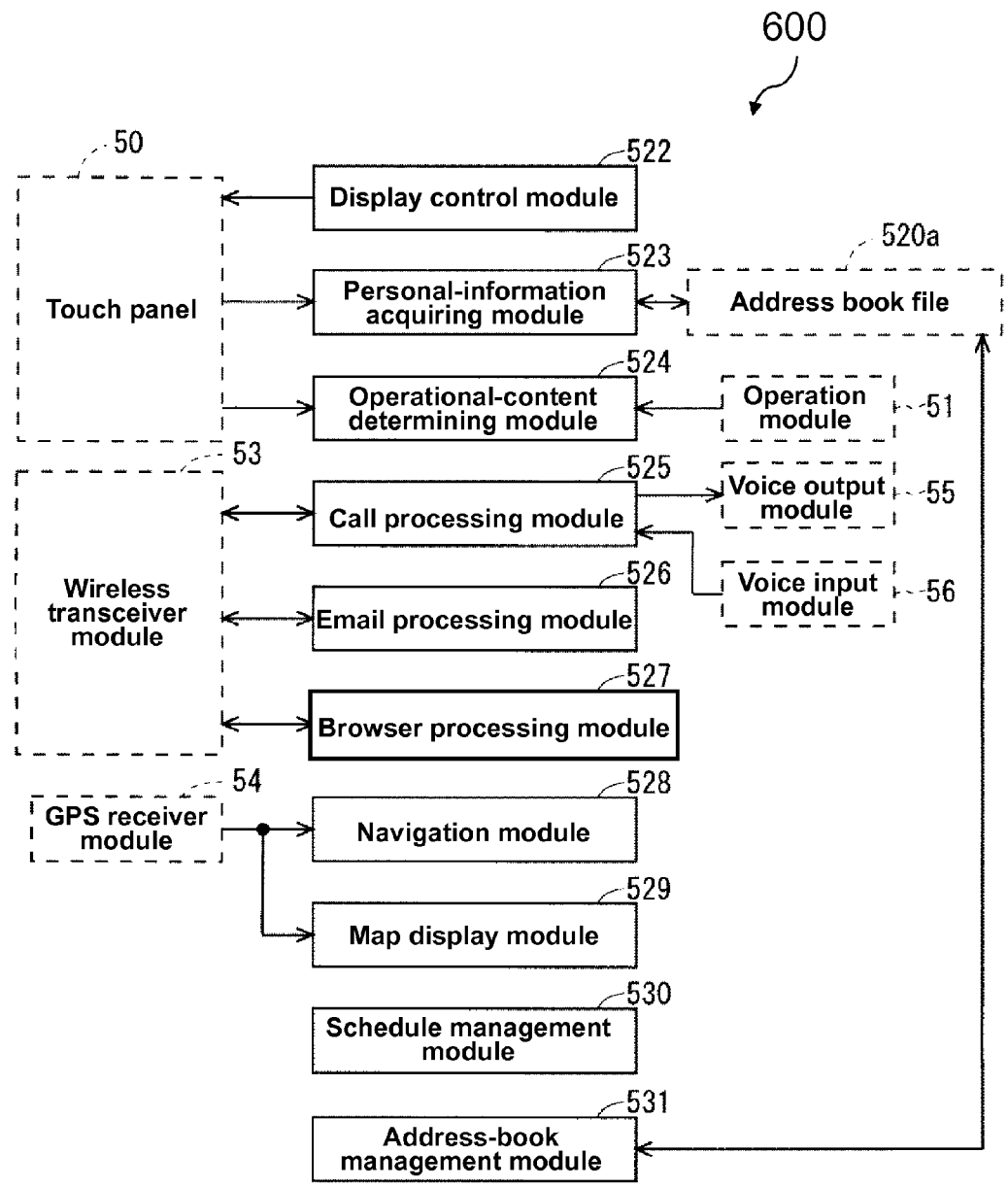
FIG. 6 is an illustration of an exemplary schematic functional block diagram of a control module according to an embodiment of the disclosure.

FIG. 6 is an illustration of an exemplary schematic functional block diagram of the control module 600 (52 in FIG. 3) according an embodiment of the disclosure. The control module 600 may comprise a display control module 522, a personal-information acquiring module 523, an operational-content determining module 524, a call processing module 525, an email processing module 526, a browser-processing module 527, a navigation module 528, a map display module 529, a schedule management module 530, and an address-book management module 531. The display control module 522 controls the touch panel 50 and displays various kinds of information such as the applications on the touch panel 50.

The personal-information acquiring module 523 accesses the address book file 520a and acquires the personal information matched to the fingerprint detected on the touch panel 50. As described above, the personal information can be used when the CPU 52a executes an application in the information-designated start.

The operational-content determining module 524 determines a content of an operation detected on the touch panel 50. The operational-content determining module 524 determines, for example but without limitation, whether an operation conducted on the touch panel 50 is an operation for starting an application or an operation for inputting a character, such as but without limitation, a prescribed letter, a number, a special character, a language character, and the like. The operational-content determining module 524 determines the content of the operation detected by the operation module 51 via the manipulation key switches 51a.

The call-processing module 525 executes the call program 521b and conducts voice communication with other mobile phones via the wireless transceiver module 53. The call-processing module 525 generates transmission signals including voice data that is input from the voice input module 56 and transmits the transmission signals to another mobile phone via the wireless transceiver module 53. The call-processing module 525 acquires the voice data from signals received by the wireless transceiver module 53 and outputs the voice data to the voice output module 55.

The email-processing module 526 executes the email program 521c, and transmits and receives emails to and from other mobile phones or communication devices communicatively coupled to the Internet via the wireless transceiver module 53. The email-processing module 526 generates an email and transmits the email to another mobile phone or a communication device communicatively coupled to the Internet via the wireless transceiver module 53. The email-processing module 526 acquires the emails from signals received by the wireless transceiver module 53.

The browser-processing module 527 executes the browser 521d and conducts communication with a server device communicatively coupled to the Internet via the wireless transceiver module 53. The browser-processing module 527 acquires a webpage transmitted from the server device communicatively coupled to the Internet from signals received by the wireless transceiver module 53 and causes the touch panel 50 to display the webpage via the display control module 522.

The navigation module 528 executes the navigation program 521e. The navigation module 528 obtains a route from a point of departure to a destination based on map information that is stored in the storage module 52b and provides the user guidance for the obtained route using the touch panel 50 or the voice output module 55. As described below, the navigation module 528 is capable of setting the current location of the mobile phone 1 that is obtained by the GPS receiver module 54 as a point of departure.

The map display module 529 executes the map display program 521f. The map display module 529 generates a map of a prescribed range based on the map information that is stored in the storage module 52b and causes the touch panel 50 to display the generated map via the display control module 522.

The schedule management module 530 executes the schedule management program 521g. The schedule management module 530 generates a schedule based on information that is inputted via the touch panel 50 or the operation module 51. The schedule management module 530 changes the generated schedule based on information that is inputted via the touch panel 50 or the operation module 51.

The address-book management module 531 executes the address book management program 521h. The address-book management module 531 registers personal information that is input via the touch panel 50 or the operation module 51 in the address book file 520a. Furthermore, the address-book management module 531 changes the personal information that is registered in the address book file 520a based on information that is inputted via the touch panel 50 or the operation module 51.

With different operations carried out by the user using the touch panel 50, the mobile phone 1 makes it possible to select whether to start an application in a state in which the personal information registered in the address book file 520a is designated as information to be used, or to start an application in a state in which the personal information is not registered as information to be used. That is, the user may designate information to be used in the application when starting the application, or the user may choose not to designate the same through an operation when using the touch panel 50. A method of starting an application in the mobile phone 1 is described below. The process of starting an application in a state in which the personal information registered in the address book file 520a is designated as information to be used is hereinafter sometimes referred as an "information-designated start", while the process of starting an application in a state in which the personal information is not designated as information to be used is sometimes referred as a "normal start". Similarly, execution of an application program with the information-designated start may be referred to as a "designated execution", and execution of an application program with the normal start may be referred to as a "normal execution". Also, an action of a finger on the touch panel that may cause the information-designated start may be referred to as an information-designated start operation. Similarly an action of a finger on the touch panel that may cause the normal start may be referred to as a normal start operation.

Figure 7B:
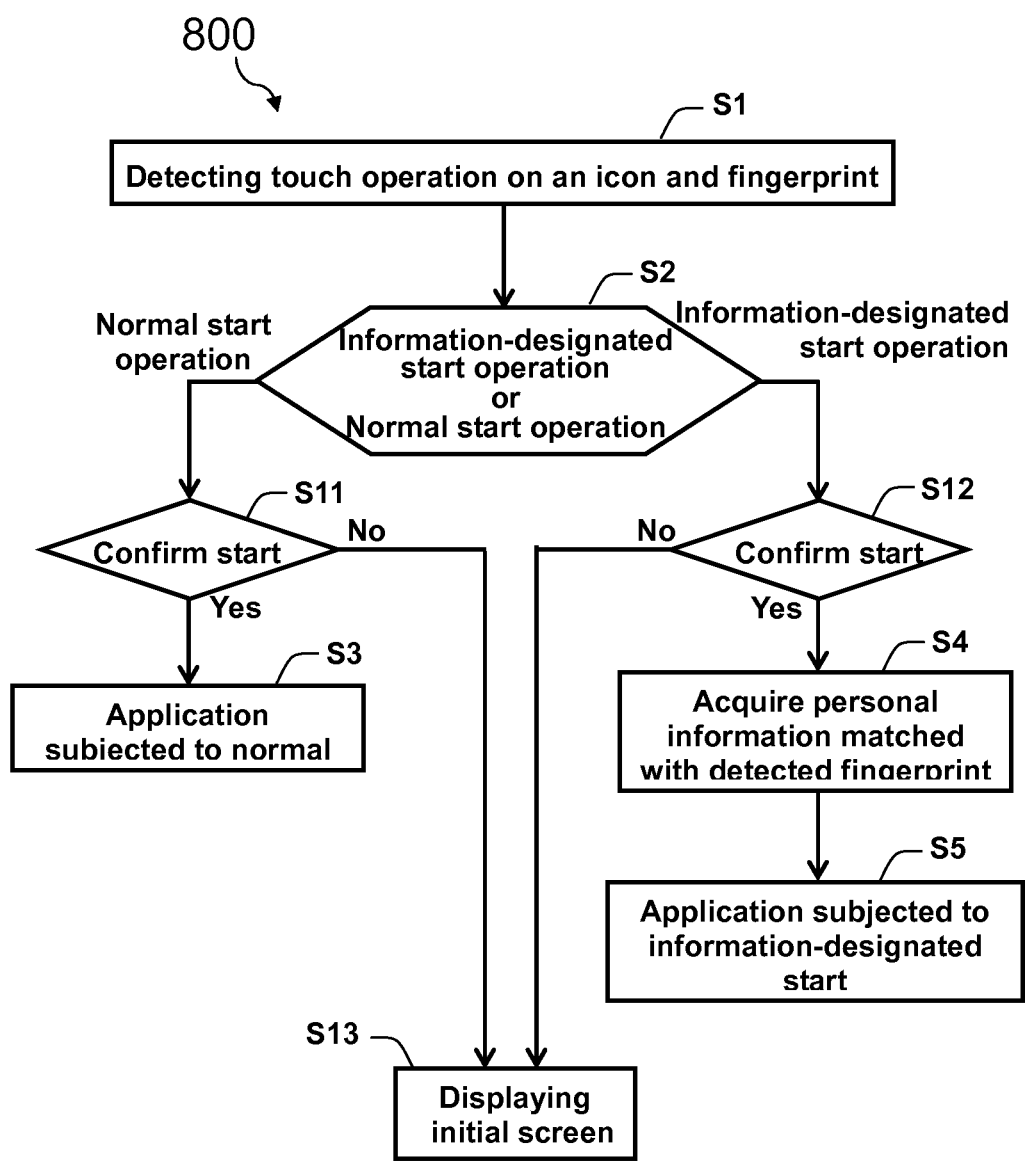
FIG. 7B is an illustration of an exemplary flowchart showing a method of starting an application other than the address book management program in a mobile phone according to an embodiment of the disclosure.

FIGS. 7A-7B are illustrations of flowcharts showing processes 700-800 for starting an application other than the address book management program 521h in the mobile phone 1 according to two embodiments of the disclosure. The various tasks performed in connection with processes 700-800 may be performed by software, hardware, firmware, a computer-readable medium having computer executable instructions for performing the process method, or any combination thereof. The processes 700-800 may be recorded in a computer-readable medium such as a semiconductor memory, a magnetic disk, an optical disk, and the like, and can be accessed and executed, for example, by a computer CPU in which the computer-readable medium is stored. It should be appreciated that processes 700-800 may include any number of additional or alternative tasks, the tasks shown in FIGS. 7A-7B need not be performed in the illustrated order, and processes 700-800 may be incorporated into a more comprehensive procedure or process having additional functionality not described in detail herein. For illustrative purposes, the following description of processes 700-800 may refer to elements mentioned above in connection with FIGS. 1-6. In practical embodiments, portions of processes 700-800 may be performed by different elements of the mobile phone 1 for starting an application other than the address book management program 521h, e.g., the wireless transceiver module 53, the control module 52, the storage module 52b, the touch panel 50, the operation module 51, etc. The processes 700-800 may have functions, material, and structures that are similar to the embodiments shown in FIGS. 1-6. Therefore common features, functions, and elements may not be redundantly described here.

The process 700 may begin by the touch panel 50 detecting both an action of a finger using a prescribed application program that is being displayed on an initial screen and the fingerprint of the finger (task S1). Icons representing a plurality of application programs are each matched to one of the applications stored in the program storage module 521 and are displayed on the initial screen of the touch panel 50.

The process 700 may continue by the operational-content determining module 524 determining whether the operation detected in task S1 is an information-designated start operation or a normal start operation (inquiry task S2). The information-designated start operation instructs the mobile phone 1 that an application corresponding to the application program on which the operation is carried out is subjected to the information-designated start operation. The normal start operation instructs the mobile phone 1 that an application corresponding to the application program on which the operation was carried out is subjected to the normal start. The information-designated start operation and the normal start operation are described in more detail below.

If the operational-content determining module 524 determines that the operation detected is the normal start operation (i.e., if a normal start operation is detected on the touch panel 50) ("normal start operation" branch of the inquiry task S2), process 700 proceeds to task S3. In this manner, an application corresponding to the operated application program is started by the CPU 52a in a state in which personal information in the address book file 520a is not designated as information to be used.

If the operational-content determining module 524 determines that the operation detected is the information-designated start operation (i.e., if an information-designated start operation is detected on the touch panel 50) ("information-designated start operation" branch of the inquiry task S2), the process 700 proceeds to task S4. In this manner, the personal-information acquiring module 523 accesses the address book file 520a, determines the personal information that is matched to the fingerprint detected in task S1, and acquires the personal information from the address book file 520a. The process 700 may then continue by the CPU 52a starting an application corresponding to the operated application program in a state in which the personal information acquired in task S4 is designated as information to be used (task 5), and process 700 ends. In this manner, a prescribed finger operation allows the user activate an application program to start an application corresponding to the application program in a state in which personal information matched to the fingerprint of the finger is used. The application program is displayed on the touch panel 50.

For example but without limitation, the normal start operation by the user using an application program corresponding to the call program 521b leads to a normal start of the call program 521b in the mobile phone 1. In response to subjecting the call program 521b to the normal start, the call-processing module 525 controls the touch panel 50 via the display control module 522 and causes the touch panel 50 to display an input screen of a telephone number. The user can enter the telephone number of a calling destination using the touch panel 50 or the operation module 51 in the mobile phone 1. Then, the call-processing module 525 connects, via the wireless transceiver module 53, with another mobile phone that is specified by the telephone number inputted by the user. In this manner, the user of the mobile phone 1 can use the voice output module 55 as well as the voice input module 56 to talk/communicate via sound with a user of the other mobile phone of the calling destination.

On the other hand, the information-designated start operation by the user subjects the call program 521b to the information-designated start in which the personal information acquired in task S4 is designated as information to be used. In this manner, the call-processing module 525 connects, via the wireless transceiver module 53, with another mobile phone that is specified by the telephone number acquired in task S4.

Process 700 is different from process 800 in that the start can be confirmed before the start of the application.

Once an operation of a permission button 300a (FIG. 8) on the touch panel 50 is detected (i.e., if the touch panel 50 detects an operation to permit the normal start) ("Yes" branch of inquiry task S11), an application corresponding to the application program icon on which the normal start operation is carried out is subjected to the normal start by the CPU 52a (task S3). If an operation of a prohibition button 300b is detected on the touch panel 50 (No branch of inquiry task S11) (i.e., if an operation for not permitting a normal start is detected on the touch panel 50), the display control module 522 causes the touch panel 50 to display the initial screen (task S13).

Likewise, the start may also be confirmed prior to task S4 (inquiry task S12). Once an operation of a permission button 310a (FIG. 9) is detected on the touch panel 50 ("Yes" branch of the inquiry task S12), the process 800 proceeds to task S4 and an application corresponding to the application program icon on which the information-designated start operation is carried out is subjected to an information-designated start by the CPU 52a (task S5). If an operation of the prohibition button 310b is detected on the touch panel 50 ("NO" branch of the inquiry task S12), the display control module 522 causes the touch panel 50 to display the initial screen (task S13).

The information-designated start selection screen 310 comprises personal information that is matched to detected fingerprints and may also comprise a display for the user to select whether or not to permit same to be information used in an application.

Figure 8:
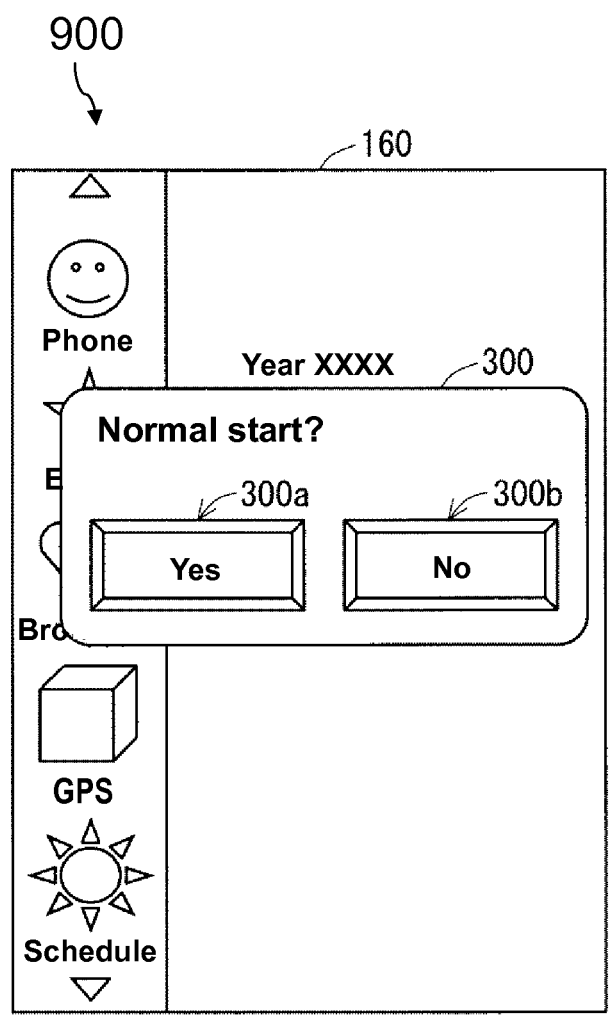
FIG. 8 is an illustration of a normal start selection screen is displayed in an overlapping manner over an initial screen according to an embodiment of the disclosure.

FIG. 8 is an illustration of a state in which the normal start selection screen 300 is displayed in an overlapping manner over an initial screen 160. A permission button 300a for permitting the normal start and a prohibition button 300b for not permitting the normal start are shown on the normal start selection screen 300. In this way, the display control module 522 may also cause the touch panel 50 to display the normal start selection screen for the user to select whether to permit the normal start or not.

Figure 9:
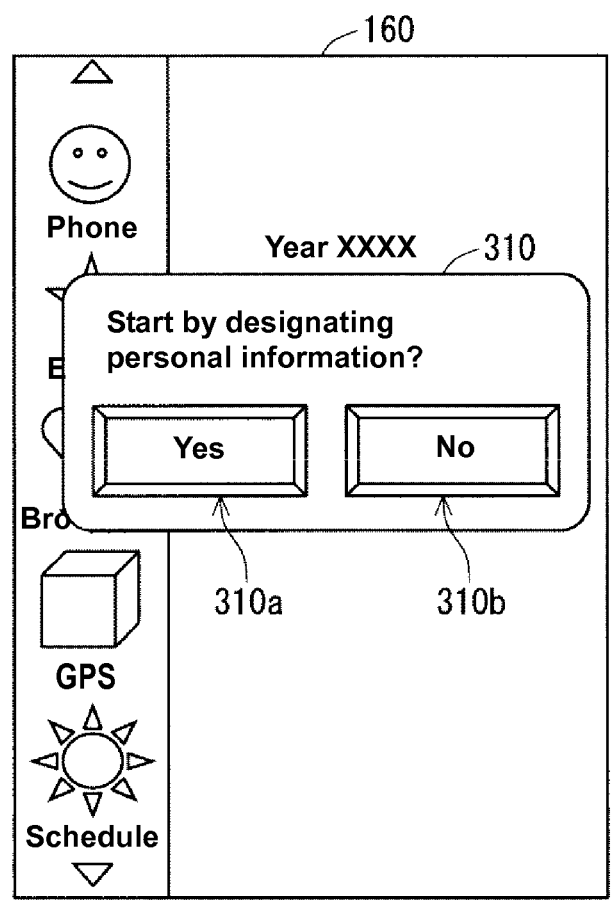
FIG. 9 is an illustration of an information-designated start selection screen displayed in an overlapping manner over the initial screen according to an embodiment of the disclosure.

FIG. 9 is an illustration of a state in which an information-designated start selection screen 310 is displayed in an overlapping manner over the initial screen 160. The permission button 310a for permitting a normal start and the prohibition button 310b for not permitting the normal start are shown on the information-designated start selection screen 310. In this way, the display control module 522 may also cause the touch panel 50 to display the information-designated start selection screen for the user to select whether to permit activation of the information-designated start or not.

Figure 10:
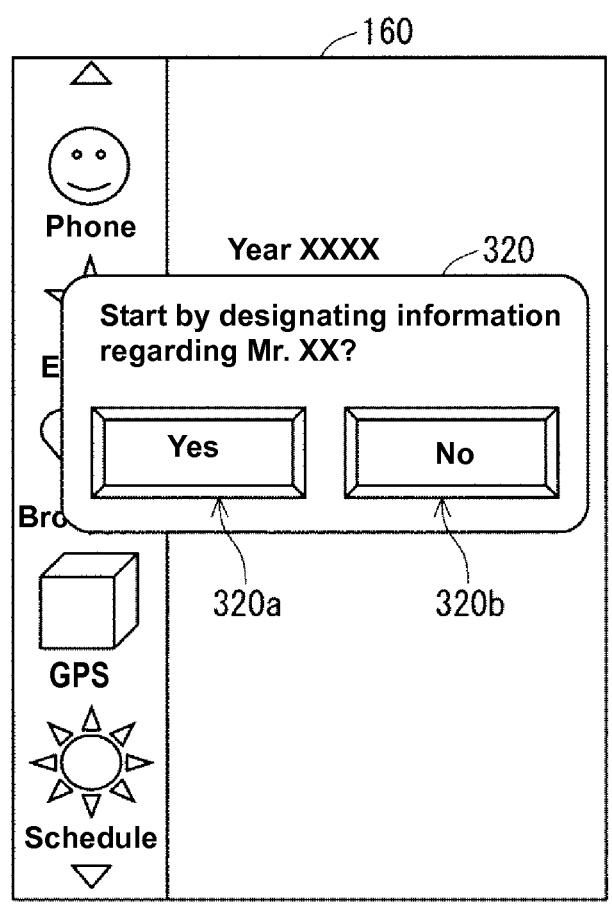
FIG. 10 is an illustration of a usage selection screen displayed in an overlapping manner over the initial screen according to an embodiment of the disclosure.

FIG. 10 is an illustration of a state in which a usage selection screen 320 is displayed in an overlapping manner over the initial screen 160. The usage selection screen 320 shows the permission button 320a for permitting personal information matched to the fingerprint detected on the touch panel 50 to be information that is used in an application as well as the prohibition button 320b for not permitting the personal information to be information that is used in an application.

Figure 11:
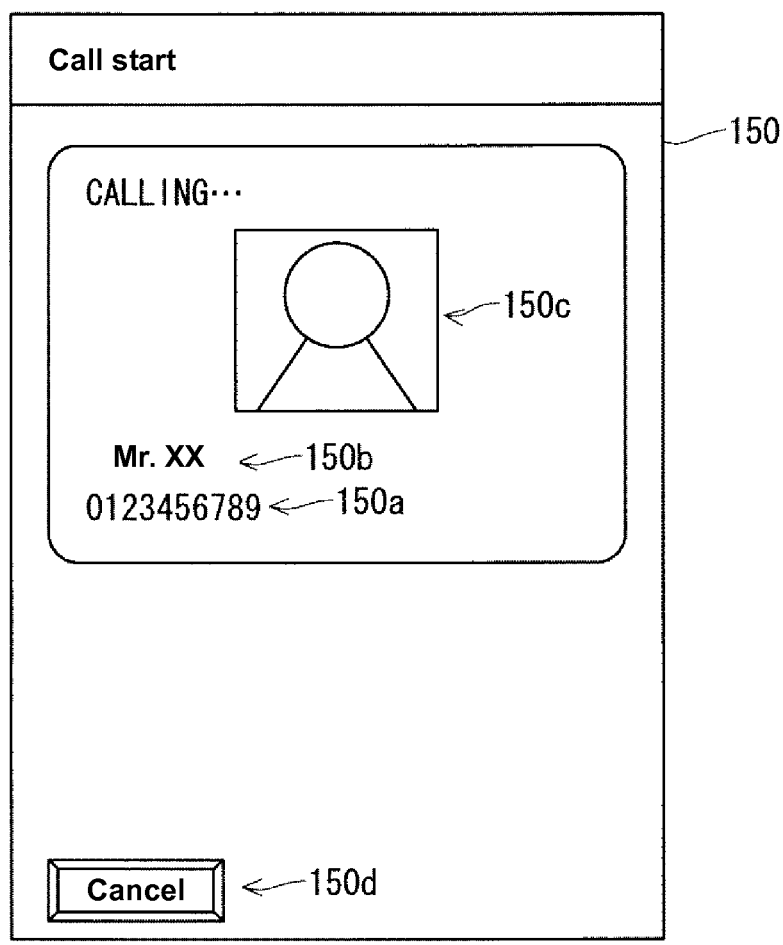
FIG. 11 is an illustration of an exemplary display screen of a touch panel when the call-processing module is connecting with another mobile phone that is specified by a telephone number of a calling destination according to an embodiment of the disclosure.

FIG. 11 is an illustration of a display screen 150 of the touch panel 50 when the call-processing module 525 is connecting with another mobile phone that is specified by the telephone number of the calling destination. A name 150b and an image 150c matched to the telephone number 150a are shown on the display screen 150 in the address book file 520a (FIG. 6) along with the telephone number 150a of the connecting destination. A cancellation button 150d for cancelling the connection with the other mobile phone is shown on the display screen 150. In a case of an information-designated start of the call program 521b, the telephone number 150a, the name 150*b*, and the image 150*c* comprised in the personal information acquired in task S4 (FIG. 7B) are shown on the display screen 150. The call-processing module 525 causes the touch panel 50 to display the display screen 150 via the display control module 522.

Figure 12:
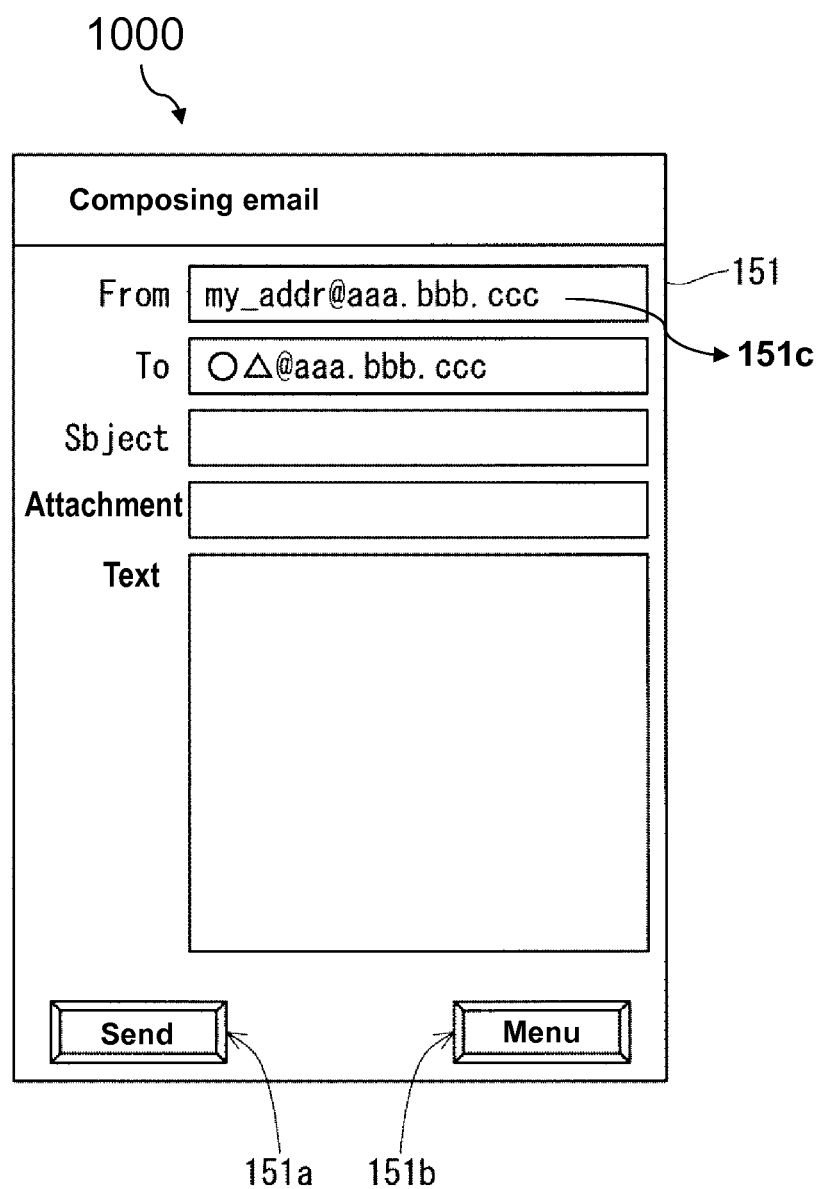
FIG. 12 is an illustration of an exemplary screen for creating an email in which an email address has already been inputted according to an embodiment of the disclosure.

FIG. 12 is an illustration of a screen 1000 for creating an email 151 comprising an email address 151*c* according to an embodiment of the disclosure. A Send button 151*a* for instructing the transmission of the email 151 and a Menu button 151*b* for displaying an email menu screen related to emails are shown on the screen 1000 for creating the email 151.

In practice, when the email program 521*c* (FIG. 4) is activated in the normal start, the email program 521*c* is subjected to the normal start. In the normal state, the email processing module 526 (FIG. 4) causes the touch panel 50 to display the email menu screen. A first icon for displaying the screen 1000 and a second icon for confirming a content of the email that has already been received are shown on the email menu screen (not shown). When the first icon displayed on the touch panel 50 is activated, the email processing module 526 causes the touch panel 50 to display the screen 1000. After an operation for inputting an address or an operation for inputting text using the touch panel 50 or the operation module 51, if an instruction operation for transmitting the email is carried out, the email-processing module 526 transmits the email via the wireless transceiver module 53 to a device that is specified by the address that is inputted.

On the other hand, when the email program 521*c* (FIG. 4) is activated in the information-designated start by the user, the email program 521*c* starts in a state in which one email address comprised in the personal information acquired in the task S4 designated as information to be used. Once the email program 521*c* is subjected to the information-designated start, the email processing module 526 causes the touch panel 50 to display the screen 1000 for creating an email in which one email address comprised in the personal information acquired in the task S4 is inputted.

Figure 13:
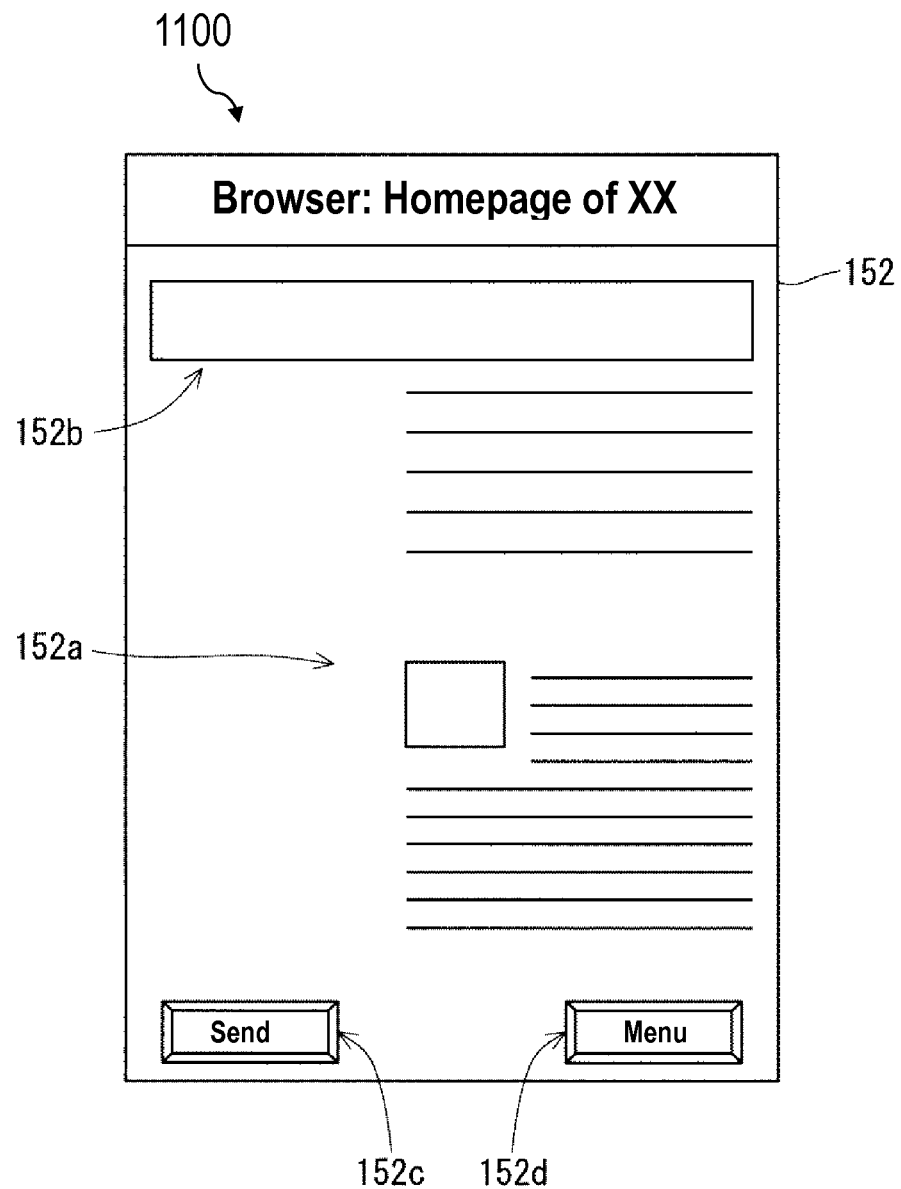
FIG. 13 is an illustration of an exemplary browser screen that can be displayed on a touch panel according to an embodiment of the disclosure.

FIG. 13 is an illustration of a screen 1100 comprising a browser screen 152 that can be displayed on the touch panel 50 according to an embodiment of the disclosure. The browser screen 152 may comprise a webpage 152*a*, an input field 152*b* for inputting a URL, a Send button 152*c* for communicatively coupling to a server device specified by the URL and a Menu button 152*d* for causing the touch panel 50 to display the initial screen. If an information-designated start of the browser 521*d* (FIG. 4) is activated, a URL comprised in the personal information is acquired in the task S4 inputted in the input field 152*b*, and the webpage 152*a* from a server device specified by the URL appears on the browser screen 152.

When the browser 521*d* (FIG. 4) is activated by the user in the normal start, the browser 521*d* is subjected to the normal start. In the normal start, the browser-processing module 527, via the wireless transceiver module 53, connects with a server device that is specified in a default URL and causes the touch panel 50 to display a webpage from the server device.

On the other hand, as mentioned above when the browser 521*d* is activated by the user in the information-designated start, the browser 521*d* starts in a state in which one URL comprised in the personal information acquired in the task S4 is designated as information to be used in the information-designated start, the browser-processing module 527, via the wireless transceiver module 53, causes the touch panel 50 to display a webpage from a server device by connecting to the server device specified in one URL comprised in the personal information acquired in task S4.

Figure 14:
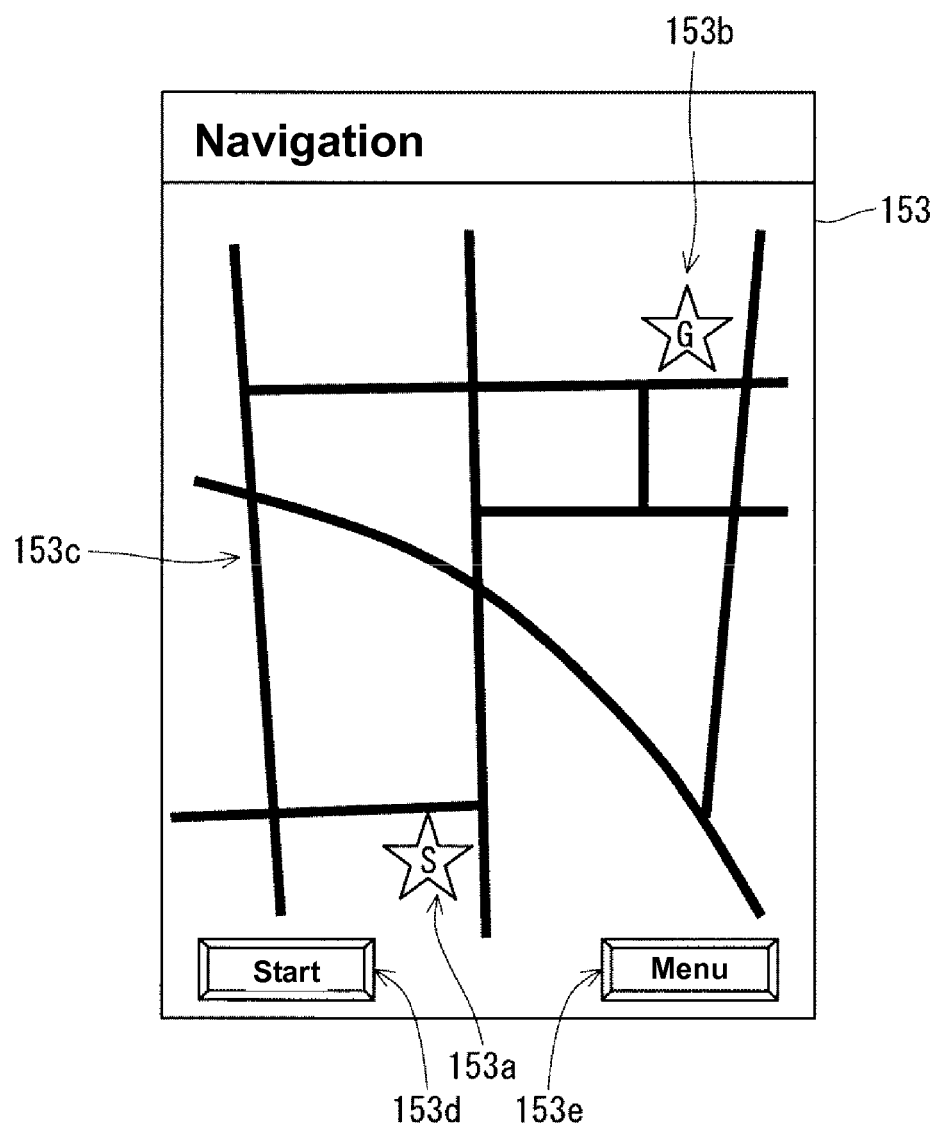
FIG. 14 is an illustration of an exemplary navigation screen displayed on the touch panel according to an embodiment of the disclosure.

FIG. 14 is an illustration of a navigation screen 153 displayed on the touch panel 50. The navigation screen 153 comprises, a graphic 153*a* indicating a point of departure, a graphic 153*b* indicating a destination, and a map 153*c* of a prescribed region comprising a point of departure and a point of destination. Furthermore, the navigation screen 153 comprises a Start button 153*d* and a Menu button 153*e* for displaying a navigation menu screen related to navigation on the touch panel 50.

In response to activation of the navigation program 521*e* (FIG. 4) in the normal start by the user, the navigation program 521*e* is subjected to the normal start. In this manner, the navigation module 528 causes the touch panel 50 to display the navigation menu screen. An input field for inputting a point of departure and an input field for inputting the point of destination and the like appear on the navigation menu screen (not shown). In response to inputting the point of departure and the destination, the navigation module 528, using to the touch panel 50 or the operation module 51, generates a map of a prescribed range. The map may comprise the point of departure and the point of destination that are inputted based on a map information stored in the storage module 52*b*. The navigation module 528, then obtains a most appropriate route connecting the point of departure and the point of destination on the map. Then, the navigation module 528 causes the touch panel 50 to display the generated map, the point of departure, and the point of destination that have been inputted. Thereafter, in response to instructing the navigation program 521*e* to start navigation, using either the touch panel 50 or the operation module 51, the navigation module 528 guides the obtained route for the user by changing the display content on the touch panel 50 or causing the voice output module 55 to output voice.

One the other hand, in response to activating the navigation program 521*e* in the information-designated start operation by the user, the navigation program 521*e* (FIG. 4) is subjected to the information-designated start operation. The navigation program 521*e* starts in a state in which an address comprised in the personal information and acquired in the task S4 is designated as the information to be used. The acquired address task is used as the destination point by the navigation module 528. A current location of the mobile phone 1 acquired by the GPS receiver module 54 is used as the point of departure by the navigation module 528. The navigation module 528 generates a map of a prescribed range comprising the point of departure as well as the point of destination determined based on the map information stored in the storage module 52*b*. The navigation module 528 then obtains the most appropriate route connecting the point of departure and the point of destination on the map. Thereafter, the navigation module 528 causes the touch panel 50 to display the generated map as well as the point of departure and the point of destination. Once an operation for an instruction to start navigation using either the touch panel 50 or the operation module 51 is received, the navigation module 528 provides the user with guidance for the obtained route. The navigation module 528 may provide the user with guidance for the obtained route by changing the displayed content on the touch panel 50 or causing the voice output module 55 to output audio.

When the map display program 521*f* is activated in the normal start operation by the user, the map display program 521*f* of the mobile phone 1 is subjected to a normal start in the mobile phone 1. In response to subjecting the map display program 521*f* to the normal start, the map display module 529 generates a map of a prescribed region including the current location of the mobile phone 1, which is output from the GPS receiver module 54, based on the map information stored in the storage module 52*b*. The map display module 529 causes the touch panel 50 to display the generated map.

On the other hand, when the map display program 521*f* is subjected to the information-designated start operation by the user, the map display program 521*f* starts in a state in which one address comprised in the personal information acquired in the task S4 is designated as information to be used. Once the map display program 521*f* is subjected to the information-designated start, the map display module 529 generates a map of a region comprising the address comprised in the personal information acquired in task S4 based on the map information stored in the storage module 52*b*. The map display module 529 causes the touch panel 50 to display the generated map.

The following accords with the information-designated start operation discussed above. If the personal information comprises information regarding a location (i.e., a location acquired by the mobile phone of a person matching the personal information), the location may be used as the destination. The location is used as the destination instead of an address comprised in the personal information. Furthermore, in an event of an information-designated start of the map display program 521*f*, it is also possible to display a map of a prescribed range on the touch panel 50. The prescribed range comprising the location indicated in the information regarding the location.

Figure 15:
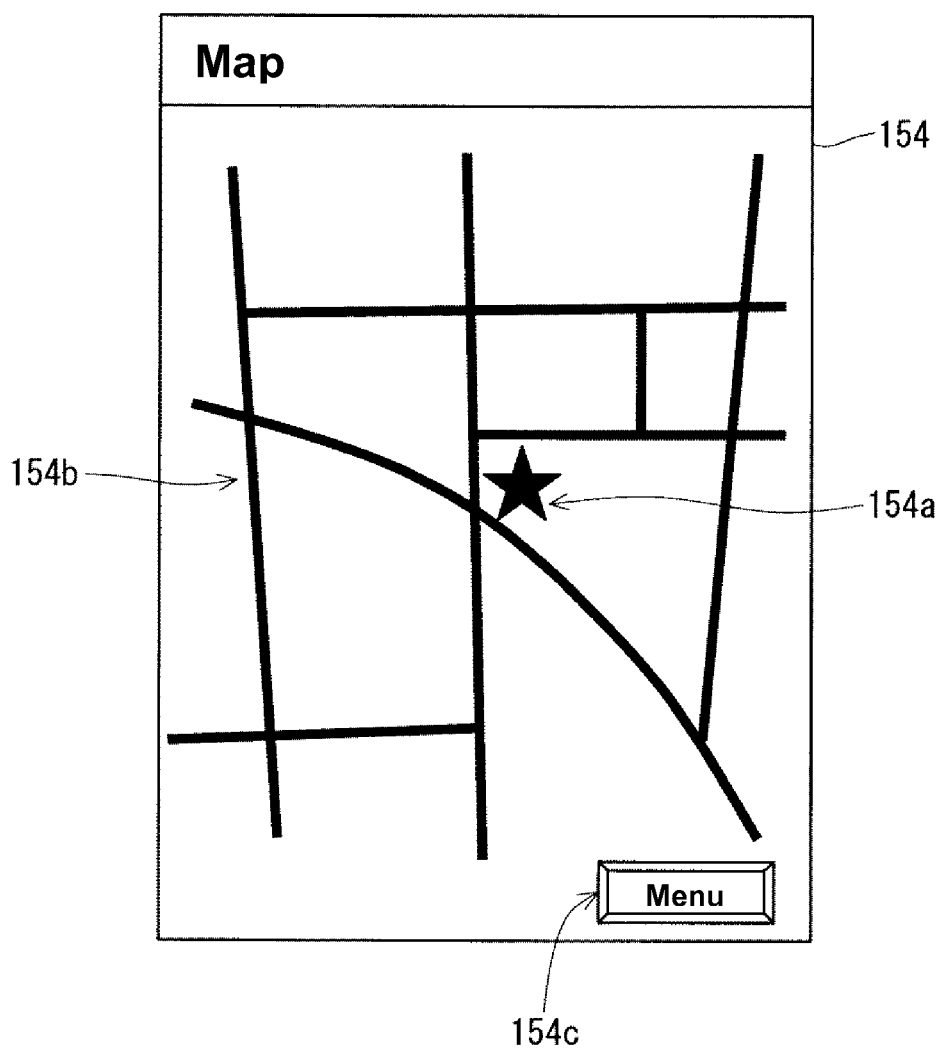
FIG. 15 is an illustration of an exemplary map display screen displayed on the touch panel according to an embodiment of the disclosure.

If the mobile phone 1 communicates with the other mobile phone and receives, from the other mobile phone, information regarding location that is acquired by the other mobile phone. Then, the information regarding location received by the mobile phone 1 is comprised in the personal information regarding the person who may own the other mobile phone, which is registered in the address book file 520*a*. In this way, the personal information registered in the address book file 520*a* comprises the information regarding location that is acquired by the mobile phone that may be owned by a person who matches the personal information. The graphic 154*a* indicating a prescribed location in FIG. 15 shows the current location of the person.

Figure 16:
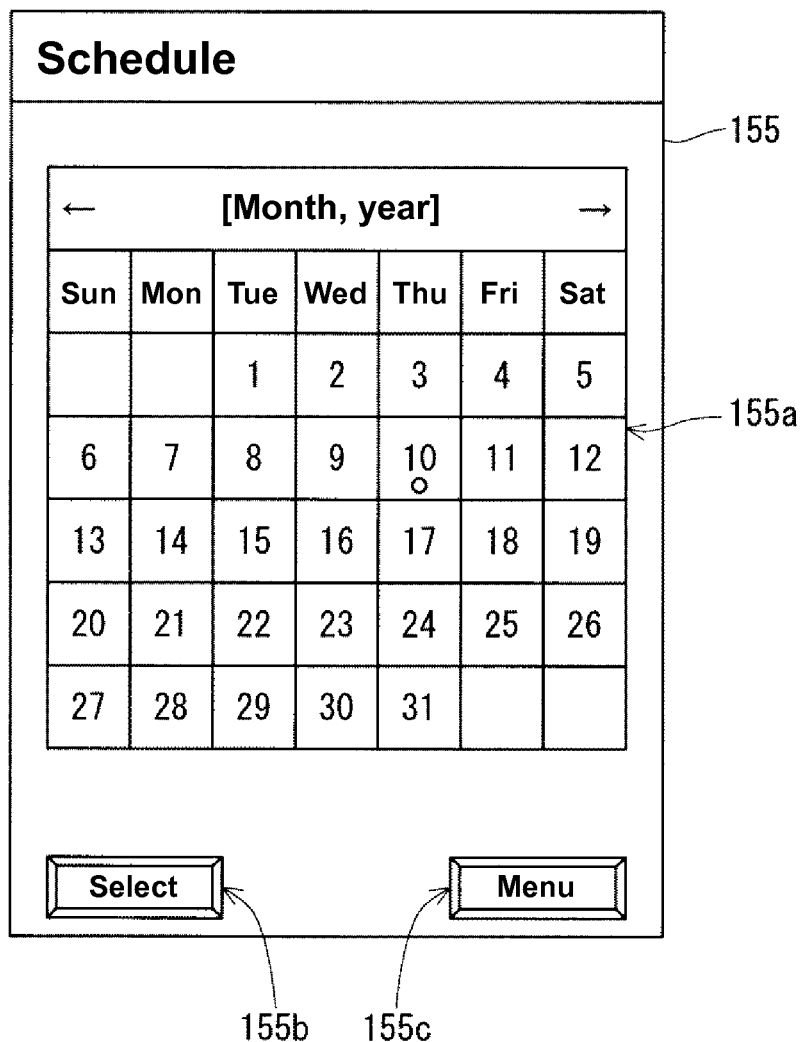
FIG. 16 is an illustration of an exemplary schedule confirmation screen that can be displayed on a touch panel according to an embodiment of the disclosure.

FIG. 16 is an illustration of a schedule confirmation screen 155 that can be displayed on the touch panel 50 according to an embodiment of the disclosure. The confirmation screen 155 comprises a schedule table 155*a*, a circle mark (shown below the subject date, "10", for setting a schedule), an Select button 155*b* for activating an instruction to set a schedule for the subject date, and a Menu button 155*c* for causing the touch panel 50 to display an initial screen.

In response to activation of the navigation program 521*e* (FIG. 4) in the normal start by the user, the schedule management program 521*g* is subjected to the normal start.

In response to activation of schedule management program 521*g* (FIG. 4) by the user, the schedule management program 521*g* of the mobile phone 1 is subjected to the normal start. In the normal state, the schedule management module 530 creates a schedule table in which the current date is the date subject to setting a schedule and causes the touch panel 50 to display the schedule table. Thereafter, once an operation for an instruction to set a schedule using the subject date is carried out using the touch panel 50 or the operation module 51, the schedule management module 530 causes the touch panel 50 to display a screen for setting a schedule using the subject date. The user may set a schedule for the subject date on the screen for setting a schedule.

On the other hand, when an application program corresponding to the schedule management program 521*g* is subjected to an information-designated start operation by the user, the schedule management program 521*g* of the mobile phone 1 starts in a state in which a date such as a date of birth comprised in the personal information acquired in the task S4 is designated as information to be used. Once the schedule management program 521*g* is subjected to the information-designated start, the schedule management module 530 generates a schedule table in which the date of birth comprised in the personal information acquired in task S4 is regarded as the date subject to setting a schedule and causes the touch panel 50 to display the schedule table. Thereafter, an operation for instructing the touch panel 50 or the operation module 51 to set a schedule using the subject data is carried out, and the schedule management module 530 causes the touch panel 50 to display a screen for setting a schedule using the subject date.

In this way, because the normal start or the information-designated start for an application corresponding to an application program may be selected simply by changing the operation performed using the application program that is being displayed on the touch panel 50, the mobile phone 1 allows the user to easily select the normal start or the information-designated start of the application.

The user may select personal information to be designated as information used when starting an application corresponding to an application program simply by changing her/his finger used for carrying out an information-designated start operation using the application program. For example, if personal information of the father of the user is matched to the fingerprint of the thumb of the user, the application may be started in a state in which the personal information of the father is designated as information to be used by carrying out an information-designated start operation with the thumb using the application program. If personal information of the mother of the user is matched to the fingerprint of the index finger of the user, the application may start in a state in which the personal information of the mother is designated as information to be used by carrying out an information-designated start operation with the index finger using the application program.

Activating, the information-designated start operation and the normal start operation are described in more detail below with reference to a plurality of examples. The information-designated start operation comprises moving a finger into a prescribed region after touching an application program icon, while remaining in contact with the touch panel 50. In contrast, a normal start operation comprises touching (tapping) an application program icon with a finger.

FIGS. 14 through 16 show one example of an initial screen 160 on the touch panel 50. An icon display region 161 for displaying a plurality of icons each corresponding to an application program is provided on the initial screen 160. The initial screen 160 also shows a destination region 162, which is a region to which a finger moves in the information-designated start operation. An upper scroll button 163 for displaying, on the touch panel 50, other application programs by scrolling the icon display region 161 to the upper side is shown on the upper module of the icon display region 161. A lower scroll button 164 for displaying, on the touch panel 50, other application programs by scrolling the icon display region 161 to the lower side is shown on the lower module of the icon display region 161.

The icon display region 161 comprises a first application icon 200*a* corresponding to an application program for starting the communication program 521*b*, a second application icon 200*b* corresponding to an application program for starting the email program 521*c*, a third application icon 200*c* corresponding to an application program for starting the browser 521*d*, a fourth application icon 200*d* corresponding to an application program for starting the navigation program

521e, and a fifth application icon 200e corresponding to an application program for starting the schedule management program 521g. The upper scroll button 163 or the lower scroll button 164 is operated by the user in order to display other application programs in the icon display region 161.

If the user wishes to perform a normal start of the call program 521b in the mobile phone 1, he/she can touch the first application icon 200a with her/his finger. In this way, in the mobile phone 1, the operational-content determining module 524 determines that the operation detected on the touch panel 50 is a normal start operation and the call program 521b is subjected to a normal start as described above. The normal start of the call program 521b is conducted by the CPU in response to the finger of the user leaving the first application icon 200a after the first icon 200a is touched by the finger (i.e., when the user taps the first application icon 200a).

Figure 18:
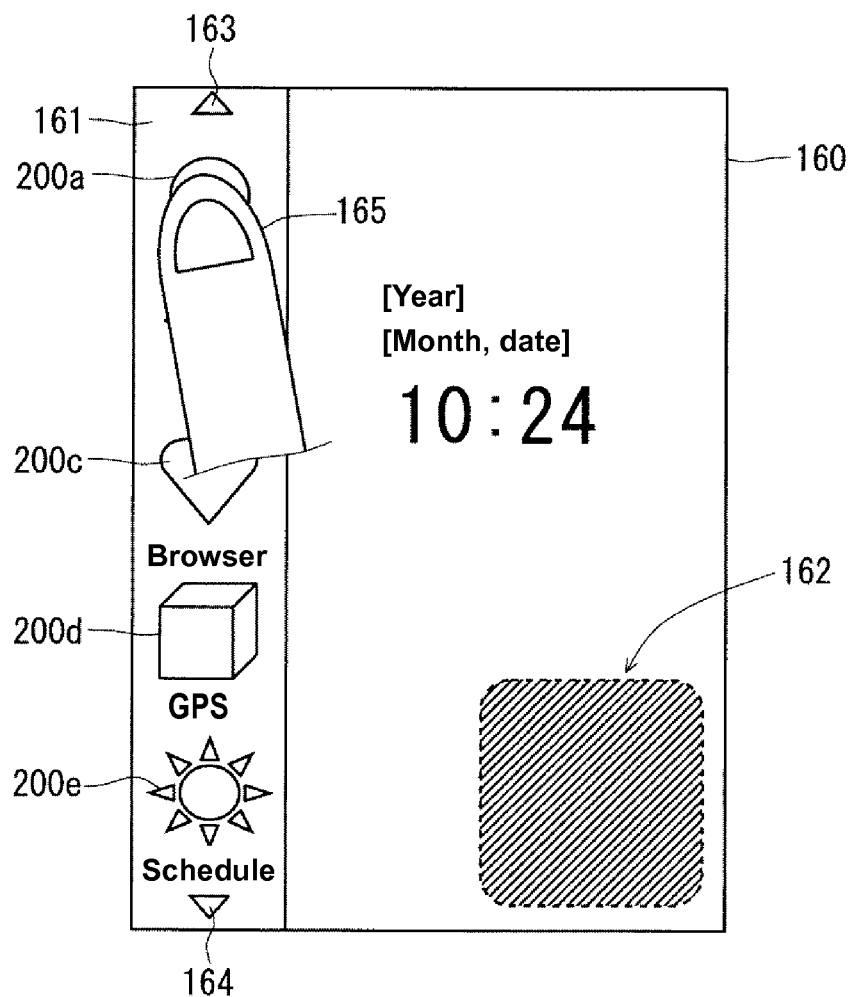
FIG. 18 is an illustration of an exemplary initial screen on a touch panel according to an embodiment of the disclosure.
Figure 19:
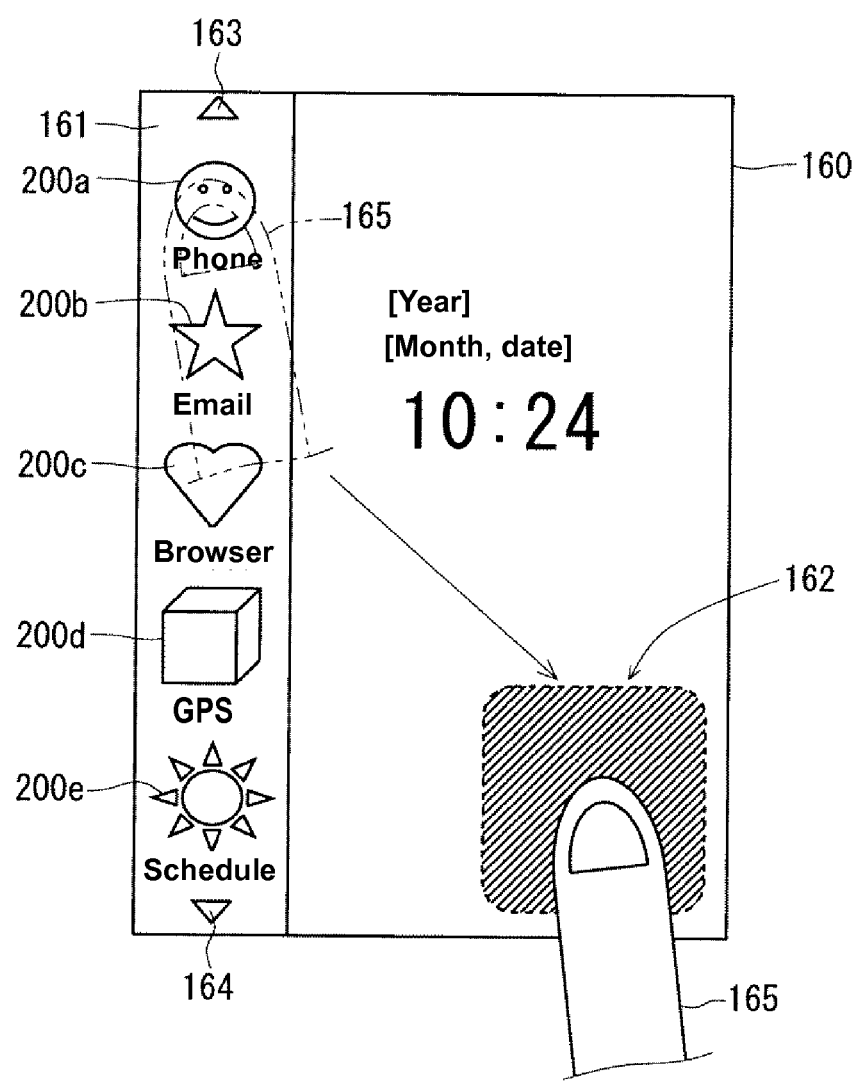
FIG. 19 is an illustration of an exemplary initial screen on a touch panel according to an embodiment of the disclosure.
Figure 20:
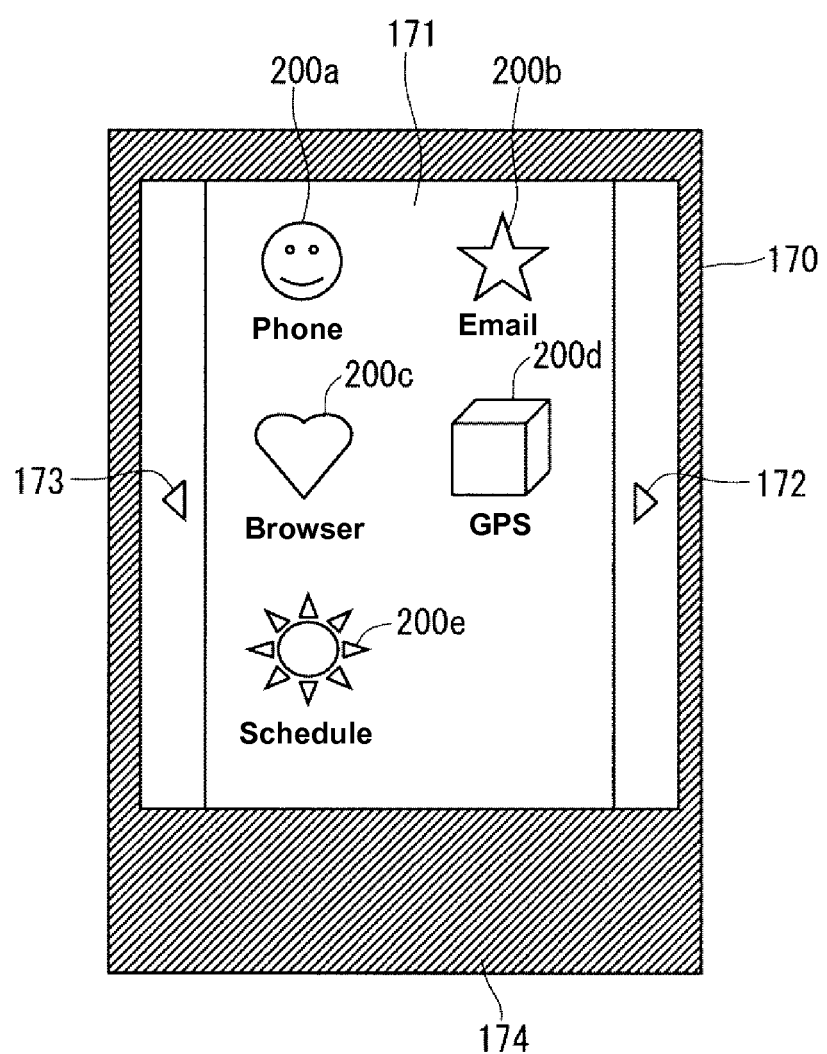
FIG. 20 is an illustration of an exemplary initial screen of a touch panel according to an embodiment of the disclosure.

On the other hand, if the user wishes to perform an information-designated start of the call program 521b in the mobile phone 1, first, as shown in FIG. 18, the first application icon 200a is touched by the user with a finger 165 that has a fingerprint to which personal information subject to designation is matched. Then, as shown in FIG. 19, the user moves the finger 165 (specifically, the portion of the finger 165 that is in contact with the touch panel 50) to a destination region 162 while the finger 165 remains in contact with the touch panel 50. At this moment, the display control module 522 may move the first application icon 200a following the movement of the finger 165 by controlling the touch panel 50, or the location of the first application icon 200a does not have to be changed. An action by the user to touch an icon that is displayed on the touch panel with a finger and then move the icon to a destination of the finger by moving the finger while remaining in contact with the touch panel is referred to as "dragging". In this way, in the mobile phone 1, the operational-content determining module 524 determines that the operation detected on the touch panel 50 is an information-designated start operation, and as described above, a call program 521b starts in a state in which the personal information matched to the fingerprint of the finger 165 is designated as information to be used. Herein, the CPU 52a may subject the call program 521b to the information-designated start in response to the finger 165 moving into the destination region 162, or may subject the call program 521b to an information-designated start in response to the finger 165 leaving the touch panel 50 after the finger moves into the destination region 162.

In one embodiment, the information-designated start operation comprises an action of a finger simply touching an application program and a normal start operation as an action of a finger moving into a prescribed region while remaining in contact with the touch panel 50 after touching an application program.

The information-designated start operation is an action of a finger moving outside of the display region of an application program while remaining in contact with the touch panel 50 after touching the application program, and the normal start operation is an action of a finger simply touching an application program.

Figure 17:
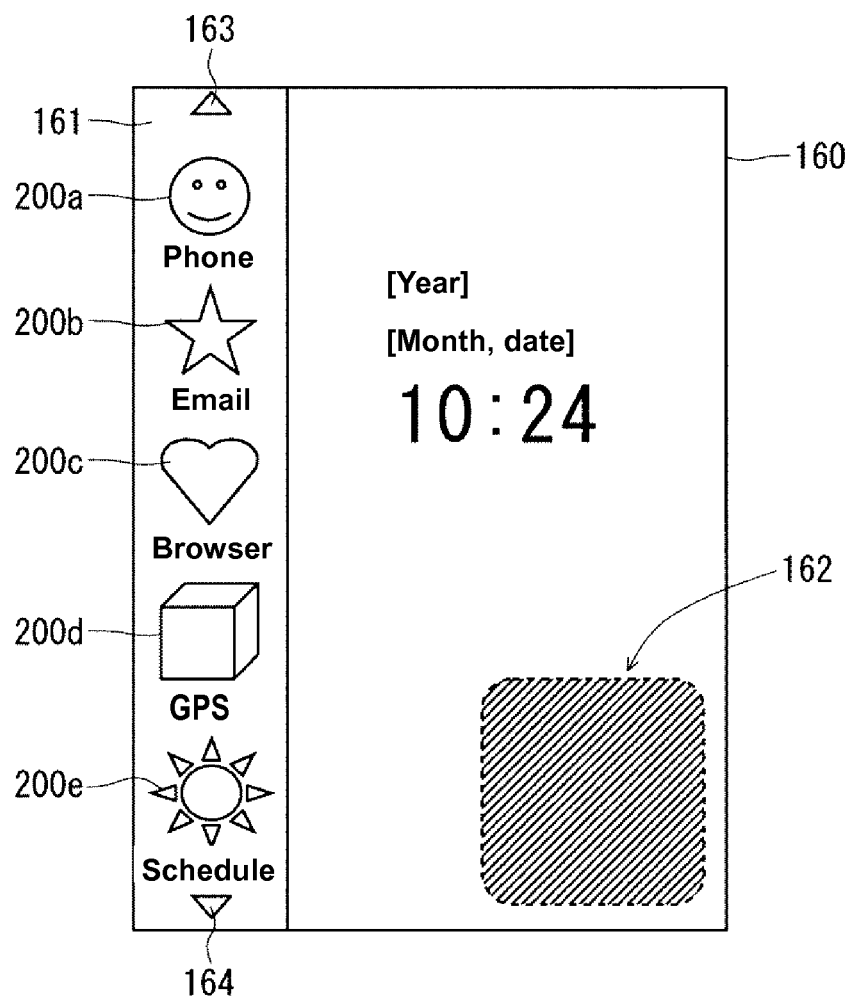
FIG. 17 is an illustration of an exemplary initial screen on a touch panel according to an embodiment of the disclosure.

FIGS. 17 through 19 are illustrations of one example of an initial screen 170 of the touch panel 50. An icon display region 171 for displaying a plurality of application programs is provided on the initial screen 170. A right side of the icon display region 171 (right side when viewing the initial screen 170) shows a right-side scroll button 172 for displaying other application programs on the touch panel 50 by scrolling the icon display region 171 toward the right. The left side of the icon display region 171 (left side when viewing the initial screen 170) shows a left-side scroll button 173 for displaying other application programs on the touch panel 50 by scrolling the icon display region 171 toward the left. Icons or the like are not displayed in the surrounding region 174 of the icon display region 171 on the initial screen 170, and the first to fifth application icons 200a through 200e are displayed in the icon display region 171.

If the user wishes to perform a normal start of the email program 521c in the mobile phone 1, the second application icon 200b is touched by the user with a finger. In this way, in the mobile phone 1, the operational-content determining module 524 determines that the operation detected on the touch panel 50 is a normal start operation and the email program 521c is subjected to a normal start as described above. The normal start of the email program 521c is conducted by the CPU 52a in response to the user taping the second application icon 200b.

Figure 21:
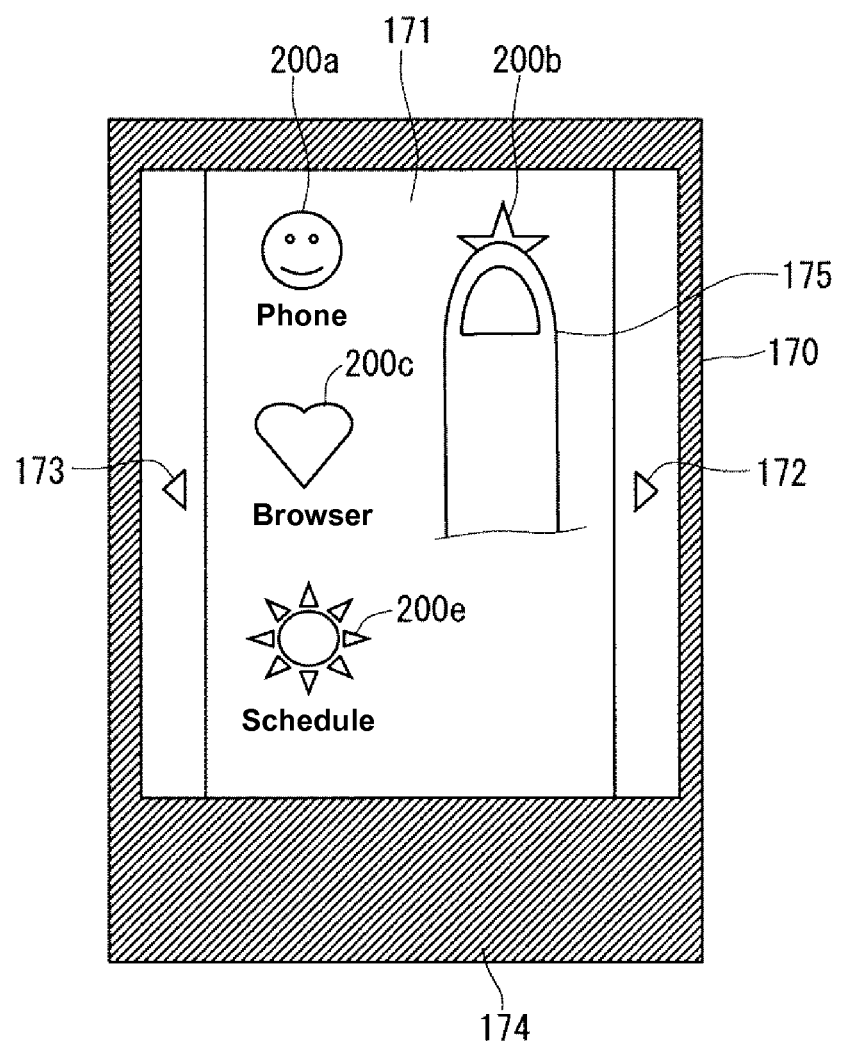
FIG. 21 is an illustration of an exemplary initial screen of a touch panel according to an embodiment of the disclosure.
Figure 22:
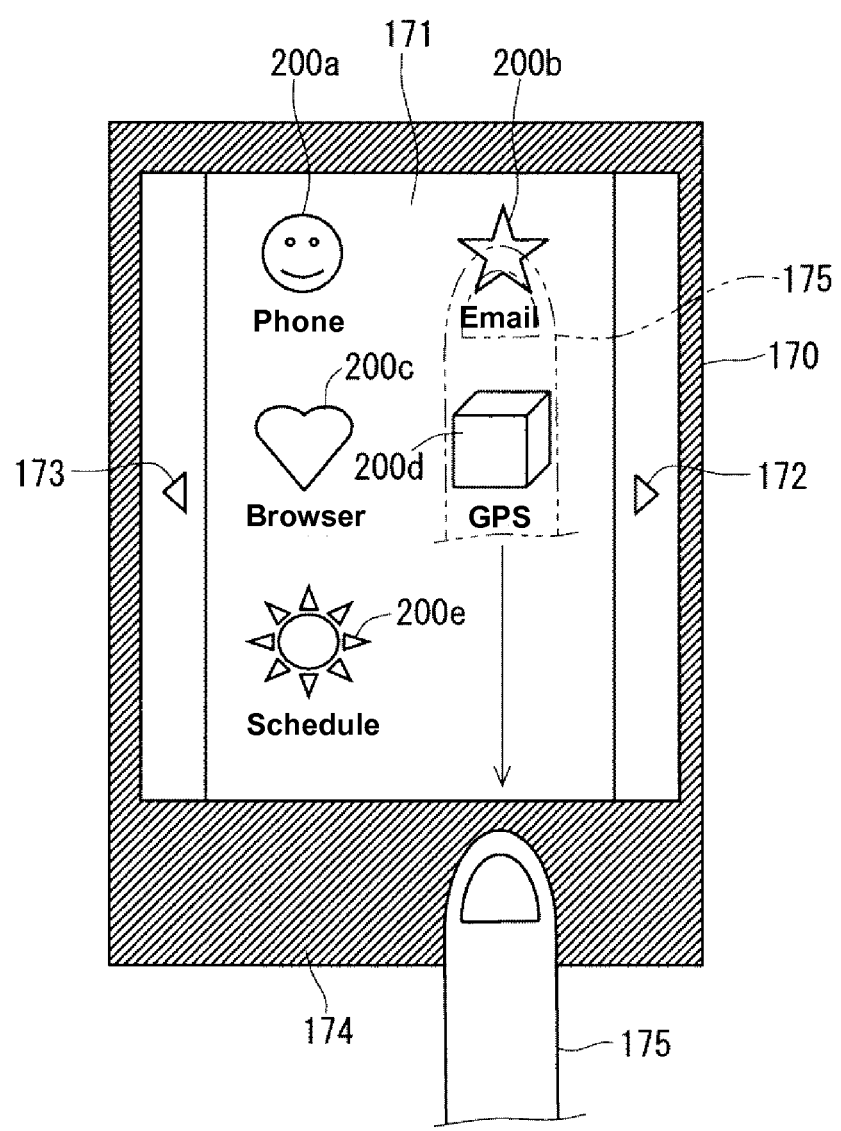
FIG. 22 is an illustration of an exemplary initial screen of a touch panel according to an embodiment of the disclosure.

On the other hand, if the user wishes to perform an information-designated start of the email program 521c in the mobile phone 1, first, as shown in FIG. 21, the second application icon 200b is touched by the user with a finger 175 that has a fingerprint to which personal information subject to designation is matched. Then, as shown in FIG. 22, the user moves the finger 175 (specifically, the portion of the finger 175 that is in contact with the touch panel 50) to a region located outside the icon display region 171 (i.e., the surrounding region 174) while the finger 175 remains in contact with the touch panel 50. Then, the display control module 522 may move the second application icon 200b following the movement of the finger 175 by controlling the touch panel 50, or the location of the second application icon 200b does not have to be changed. In this way, in the mobile phone 1, the operational-content determining module 524 determines that the operation detected on the touch panel 50 is an information-designated start operation, and as described above, the email program 521c starts in a state in which the personal information matched to the fingerprint of the finger 175 is designated as information to be used. Herein, the CPU 52a may subject the email program 521c to an information-designated start in response to the finger 175 moving into the surrounding region 174 or may subject the email program 521c to an information-designated start in response to the finger 175 leaving the touch panel 50 after the finger 175 moves into the surrounding region 174.

In one embodiment, activation of the information-designated start operation comprises a finger simply touching an application program icon and the normal start operation as an action of a finger moving outside the icon display region 171 while remaining in contact with the touch panel 50 after touching the application program icon.

In one embodiment, the information-designated start operation is an action of a finger touching an application program icon several times within a predetermined period of time, and the normal start operation is an action of a finger touching an application program icon only once within a predetermined period of time.

If the user wishes to perform the normal start of the browser 521d in the mobile phone 1, an application program icon for starting the browser 521d is touched once within a predetermined period of time. In this way, as described above, the browser 521d is subjected to a normal start in the mobile phone 1. Herein, the CPU 52a may subject the browser 521d to a normal start at the moment after a predetermined period of time has elapsed or subject the browser 521d to a normal start in response to the finger leaving the icon in a case in which the finger remains in contact with the application program after a predetermined period of time has elapsed.

On the other hand, if the user wishes to perform an information-designated start of the browser 521d in the mobile phone 1, an application program icon for starting the browser 521d is touched a plurality of times within a predetermined period of time with a finger having an authenticated fingerprint (i.e., a fingerprint to which personal information subject to designation is matched). In this way, as described above, the browser 521d starts in a state in which the personal information matched to the fingerprint of the finger detected on the touch panel 50 is designated as information to be used. Herein, the CPU 52a may subject the browser 521d to an information-designated start after a predetermined period of time has elapsed, or subject the browser 521d to an information-designated start in response to the finger leaving the icon in a case in which the finger remains in contact with the application program after a predetermined period of time elapses.

In one embodiment, activation of the information-designated start operation comprises an action of a finger touching an application program icon only once within a predetermined period of time and a normal start operation as an action of a finger touching an application program a plurality of times within a predetermined period of time.

In one embodiment, the information-designated start operation comprises an action of a finger touching an application program icon for longer than a prescribed period of time, and the normal start operation comprises an action of a finger touching an application program for a shorter period than the predetermined period of time. Herein, the action of a finger touching an application program with a finger for a predetermined period of time may be either an information-designated start operation or a normal start operation.

If the user wishes to perform the normal start of the navigation program 521e in the mobile phone 1, an application program for starting the navigation program 521e is touched by a finger for a shorter period than a predetermined period of time. In this way, as described above, the navigation program 521e is subjected to the normal start in the mobile phone 1. The normal start of the navigation program 521e is conducted by the CPU 52a in response to the user tapping the application program.

On the other hand, if the user wishes to perform an information-designated start of the navigation program 521e in the mobile phone 1, an application program icon for starting the navigation program 521e is touched for longer than the predetermined period of time with a finger having an authenticated fingerprint (i.e., a fingerprint to which personal information subject to designation is matched). In this way, as described above, the navigation program 521e starts in a state in which the personal information matched to the fingerprint of the finger detected on the touch panel 50 is designated as information to be used. Herein, the CPU 52a may subject the navigation program 521e to the information-designated start in response to touching the application program by a finger for longer than a predetermined period of time or may subject the navigation program 521e to the information-designated start in response to finger that is in touch with the application program for longer than the predetermined period of time leaving the application program.

In one embodiment, activation of the information-designated start operation may comprise an action of a finger touching an application program for a shorter period than a predetermined period of time, and the normal start operation may comprise an action of a finger touching an application program for a longer period than a predetermined period of time.

In one embodiment, the information-designated start operation is an action of a finger moving farther than a predetermined distance while remaining in contact with the touch panel after touching an application program, and the normal start operation is an action of a finger simply touching an application program. Herein, an action of a finger moving by a predetermined distance while remaining in contact with the touch panel after touching the application program may also be regarded as an information-designated start operation.

Figure 23:
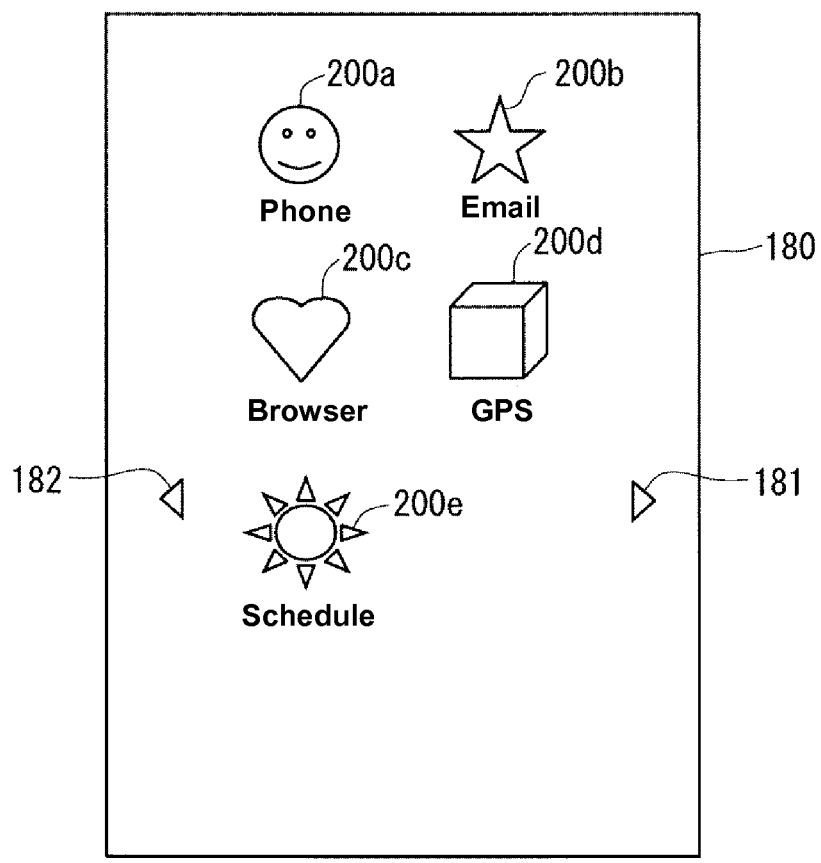
FIG. 23 is an illustration of an exemplary screen of the touch panel according to an embodiment of the disclosure.

FIGS. 20 through 24 are illustrations of exemplary initial screen 180 of the touch panel 50. A plurality of application programs is shown on the initial screen 180. The end module on the right side of the initial screen 180 shows a right-side scroll button 181 for displaying other application programs on the touch panel 50 by scrolling the initial screen 180 toward the right. The end module on the left side of the initial screen 180 shows a left-side scroll button 182 for displaying other application programs on the touch panel 50 by scrolling the initial screen 180 toward the left. In FIG. 23, application icons 200a through 200e are displayed on the initial screen 180.

If the user wishes to perform a normal start of the schedule management program 521g in the mobile phone 1, the fifth application icon 200e is to be touched by a finger. In this way, as described above, the schedule management program 521g is subjected to a normal start in the mobile phone 1. The normal start of the schedule management program 521g is conducted by the CPU 52a in response to the user taps the fifth application icon 200e.

Figure 24:
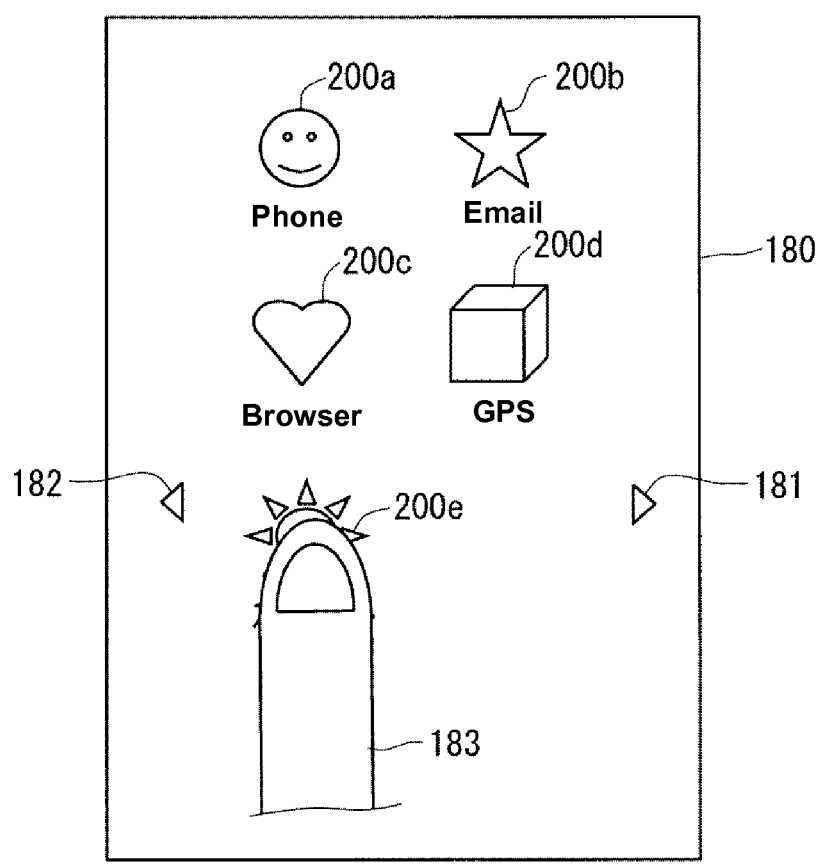
FIG. 24 is an illustration of an exemplary screen of a touch panel according to an embodiment of the disclosure.
Figure 25:
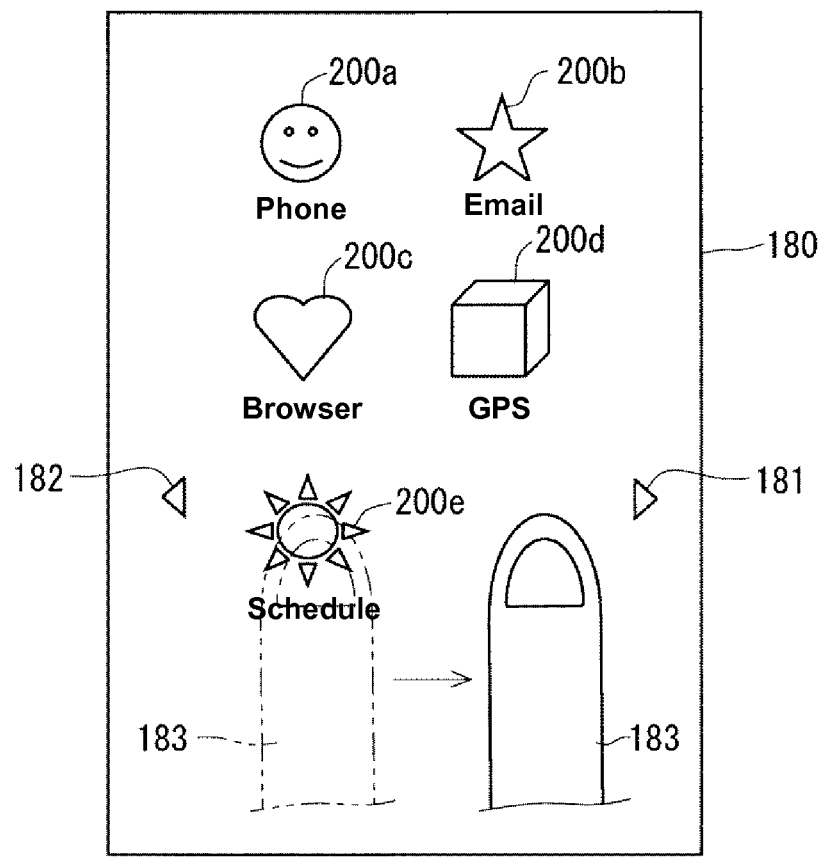
FIG. 25 is an illustration of an exemplary screen of a touch panel according to an embodiment of the disclosure.

On the other hand, if the user wishes an information-designated start of the schedule management program 521g in the mobile phone 1, first, as shown in FIG. 24, the fifth application icon 200e is to be touched by a finger 183 that has a fingerprint to which personal information subject to designation is matched. Then, as shown in FIG. 25, the user moves the finger 183 farther than a prescribed distance while the finger 183 remains in contact with the touch panel 50. At this moment, the display control module 522 may move the fifth application icon 200e so as to allocate the fifth application icon 200e to the destination of the finger 183 by following the movement of the finger 183 by controlling the touch panel 50, or the location of the fifth application icon 200e does not have to be changed. In this way, in the mobile phone 1, as described above, the schedule management program 521g starts in a state in which the personal information matched to the fingerprint of the finger 183 is designated as information to be used. Herein, the CPU 52a may subject the schedule management program 521g to an information-designated start in response to the finger of the user moving farther than a prescribed distance, or may subject the schedule management program 521g to an information-designated start in response to the finger of the user leaving the touch panel 50 after moving farther than a prescribed distance.

In one embodiment, activation of the information-designated start operation comprises an action of a finger simply touching an application program and the normal start operation comprises an action of a finger moving farther than a prescribed distance while remaining in contact with the touch panel 50 after touching an application program.

Figure 26:
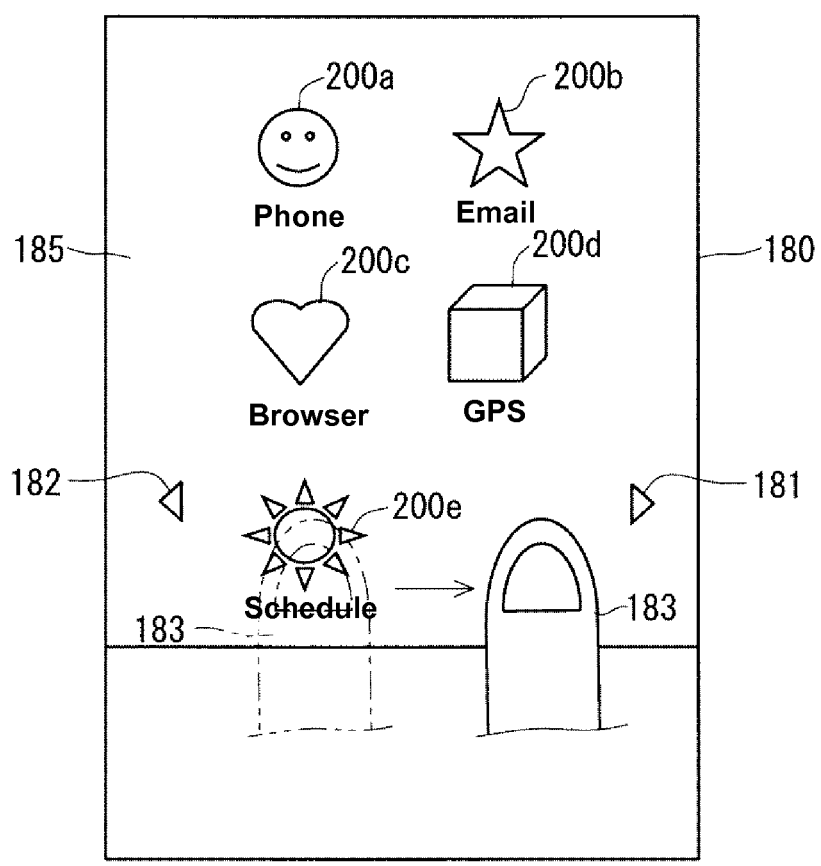
FIG. 26 is an illustration of an exemplary screen of a touch panel according to an embodiment of the disclosure.
Figure 27:
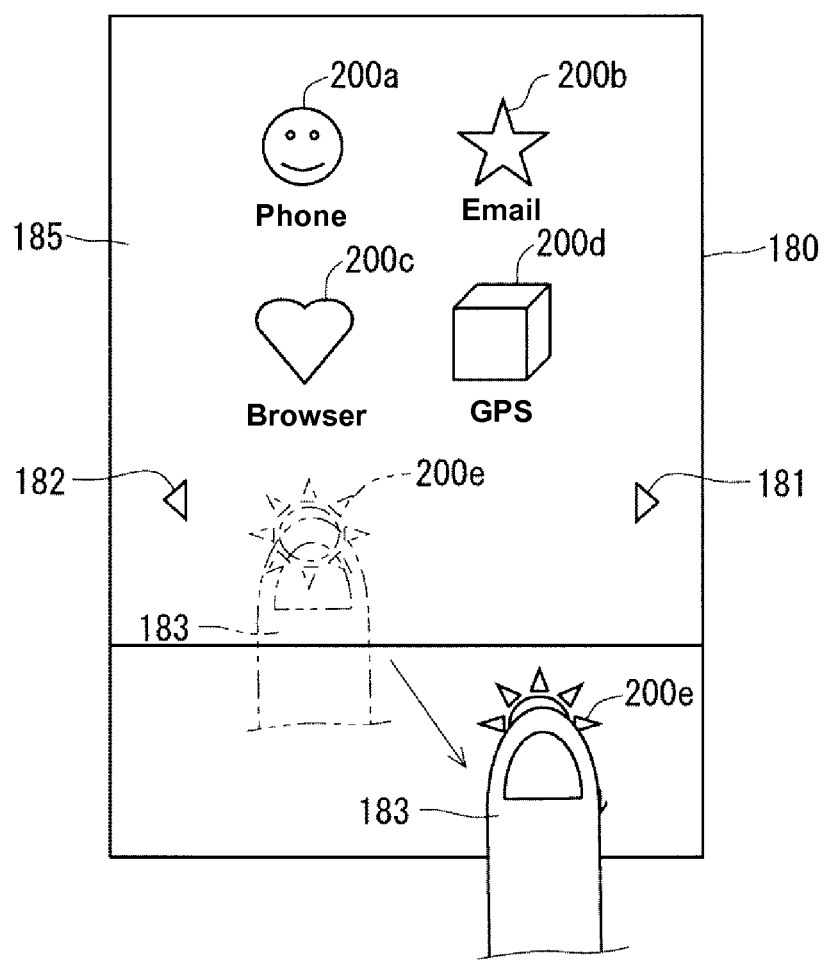
FIG. 27 is an illustration of an exemplary screen of a touch panel according to an embodiment of the disclosure.

In the embodiment, shown in FIG. 26, the information-designated start operation may also be regarded as an action of a finger moving farther than a predetermined distance in a predetermined region 185 while remaining in contact with the touch panel 50 after touching the application program icon with the finger 183. As shown in FIG. 27, if the finger 183 moving outside the prescribed region 185 while remaining in contact with the touch panel 50 after touching the application program icon, the display control module 522 may move the application program to the destination of the finger 183 by following the movement of the finger 183 to move the application program by controlling the touch panel 50.

In one embodiment, the information-designated start operation is an action of a finger moving faster than a prescribed speed while remaining in contact with the touch panel 50 after touching an application program icon with a finger, and a normal start operation is an action of simply touching an application program icon. Herein, an action of a finger moving faster than the predetermined speed while remaining in contact with the touch panel 50 after touching the application program icon may also be regarded as an information-designated start operation.

If the user wishes to perform a normal start of a prescribed application in the mobile phone 1, an icon for starting the application is to be touched. In this way, the application corresponding to the icon touched by the user's finger is subjected to the normal start in the mobile phone 1. The normal start of the application is conducted by the CPU 52*a* in response to the user taping the application program icon.

On the other hand, if the user wishes to perform an information-designated start of a prescribed application in the mobile phone 1, an application program icon corresponding to the application is touched by a finger that has a fingerprint to which personal information subject to designation is matched. Then, the user moves the finger faster than a predetermined speed while the finger remains in contact with the touch panel 50. Then, the display control module 522 may move the application program icon so as to allocate the application program icon to the destination of the finger by following the movement of the finger by controlling the touch panel 50, or the location of the application program icon may remain stationary. In this way, in the mobile phone 1, the application corresponding to the application program icon operated by the user's finger starts in a state in which the personal information matched to the fingerprint of the finger is designated as information to be used. Herein, the CPU 52*a* may subject the application to an information-designated start in response to the user's finger moving faster than a prescribed speed, or may subject the application to an information-designated start in response to the user's finger leaving the touch panel 50 after moving faster than the prescribed speed.

In one embodiment, the information-designated start operation comprises an action of a finger simply touching an application program icon and the normal start operation comprises an action of a finger moving faster than a predetermined speed while remaining in contact with the touch panel after touching an application program icon.

In one embodiment, the information-designated start operation is an action of a finger moving in a predetermined shape while remaining in contact with the touch panel 50 after touching an application program icon, and the normal start operation is an action of a finger simply touching an application program icon.

The initial screen of the touch panel 50 may have the same configuration as the initial screen 180 shown in the above FIG. 24.

If the user wishes to perform a normal start of the schedule management program 521*g* in the mobile phone 1, the fifth application icon 200*e* on the initial screen 180 is touched by a finger. In this way, the schedule management program 521*g* is subjected to a normal start in the mobile phone 1. The normal start of the schedule management program 521*g* is conducted by the CPU 52*a* in response to the user taps the fifth application icon 200*e*.

Figure 28:
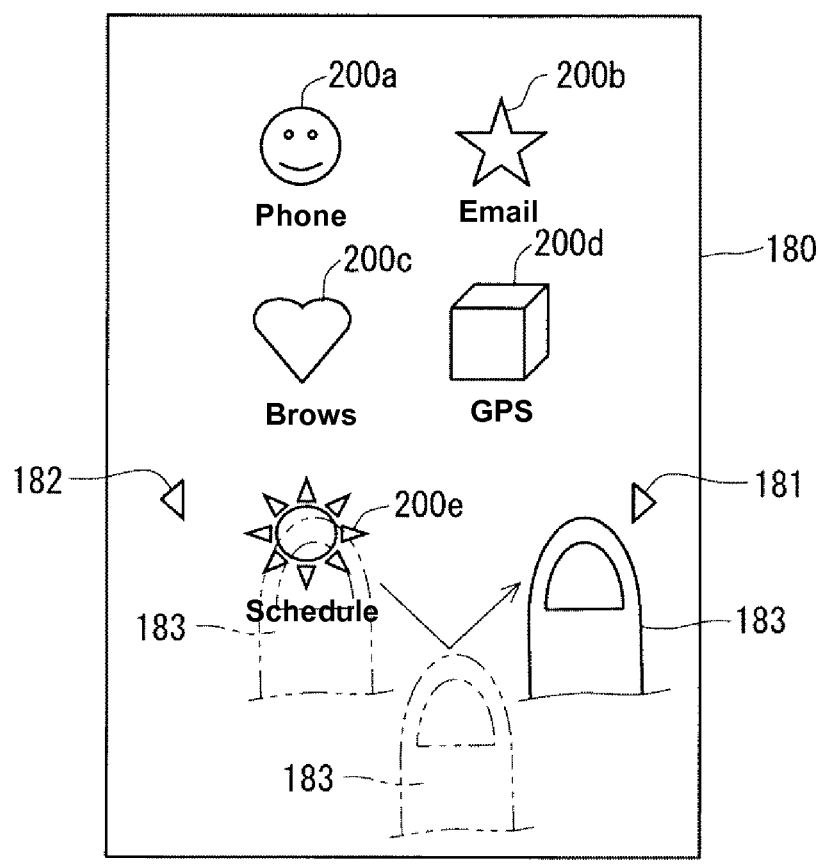
FIG. 28 is an illustration of an exemplary screen of the touch panel according to an embodiment of the disclosure.

On the other hand, if the user wishes to perform an information-designated start of the schedule management program 521*g* in the mobile phone 1, first, as shown in FIG. 24, the fifth application icon 200*e* is touched by a finger 183 that has a fingerprint to which personal information subject to designation is matched. Then, as shown in FIG. 28, the user moves the finger 183 in a predetermined shape (the letter "V" in FIG. 28) while the finger 183 remains in contact with the touch panel 50. Then, the display control module 522 may move the fifth application icon 200*e* by following the movement of the finger 183 so as to allocate the fifth application icon 200*e* to the destination of the finger 183 by controlling the touch panel 50, or the location of the fifth application icon 200*e* does not have to be changed. In this way, in the mobile phone 1, as described above, the schedule management program 521*g* starts in a state in which the personal information matched to the fingerprint of the finger 183 is designated as information to be used. Herein, the CPU 52*a* may subject the schedule management program 521*g* to an information-designated start in response to the finger moving in the predetermined shape or may subject the schedule management program 521*g* to an information-designated start in response to the finger leaving the touch panel 50 after moving in the predetermined shape.

FIG. 30 is an illustration of an exemplary address-book registration screen 210 according to an embodiment of the disclosure. The address-book registration screen 210 shows an input field 210*a* for a name, an input field 210*b* for inputting the reading of kanji characters entered in the input field 210*a*, a plurality of input fields 210*c* through 210*e* for inputting telephone numbers, a plurality of input fields 210*f* through 210*h* for inputting email addresses, an input field 210*i* for a URL, an input field 210*j* for an address, an input field 210*k* for a date of birth, and an input field 210*l* for a blood type. By operating the touch panel 50 or the operation unit 51, the user may input information using each of the plurality of input fields 210*a* through 210*l*.

The address-book registration screen 210 shows a display button 210*m* for causing the touch panel 50 to display an initial screen and a registration button 210*n* for an instruction to register, into the address book file 520*a*, the personal information input on the address-book registration screen 210.

Figure 31:
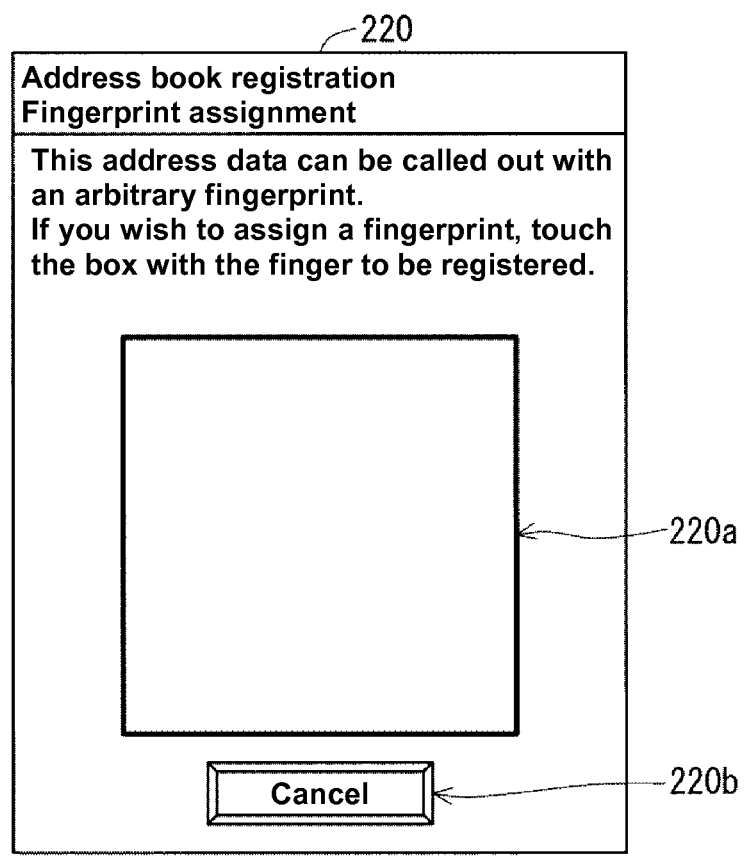
FIG. 31 is an illustration of an exemplary fingerprint registration screen according to an embodiment of the disclosure.

FIG. 31 is an illustration of an exemplary fingerprint registration screen 220. A region 220*a* to be touched by a finger that has a fingerprint subject to registration is shown on the fingerprint registration screen 220. Furthermore, a cancellation button 220*b* for cancelling the fingerprint registration and causing the touch panel 50 to display an initial screen is shown on the fingerprint registration screen 220.

Figure 32:
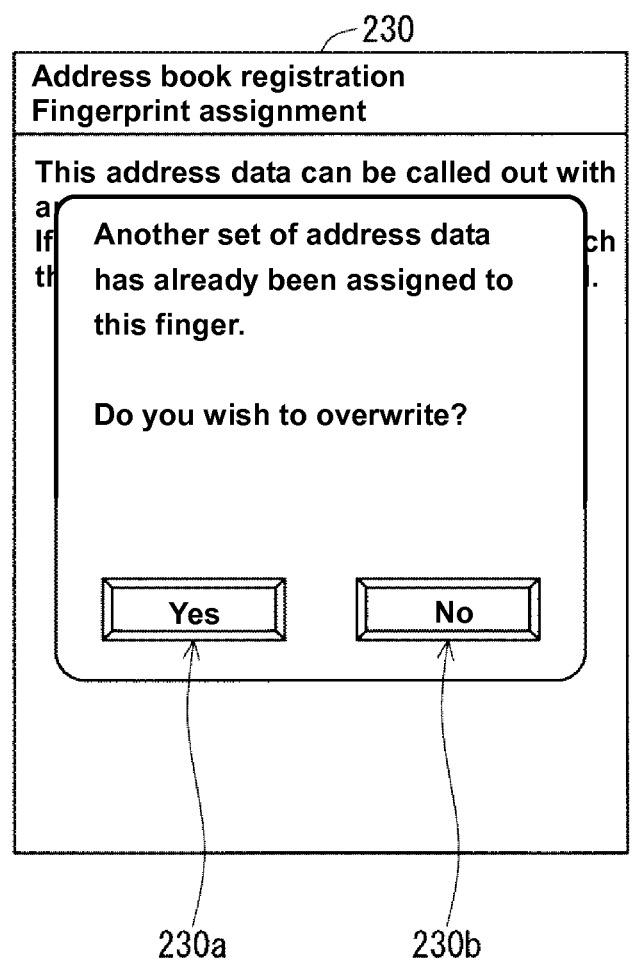
FIG. 32 is an illustration of an exemplary overwrite selection screen according to an embodiment of the disclosure.

FIG. 32 is an illustration of an exemplary overwrite selection screen 230. The overwrite selection screen 230, comprises a permission button 230*a* for issuing permission for overwriting and a prohibition button 230*b* for issuing an instruction not to overwrite are shown on the overwrite selection screen 230.

A method for registering a fingerprint of the user in the address book file 520*a* is described below. As a result of executing the address book management program 521*h*, the fingerprint may be registered in the address book file 520*a*.

Figure 29:
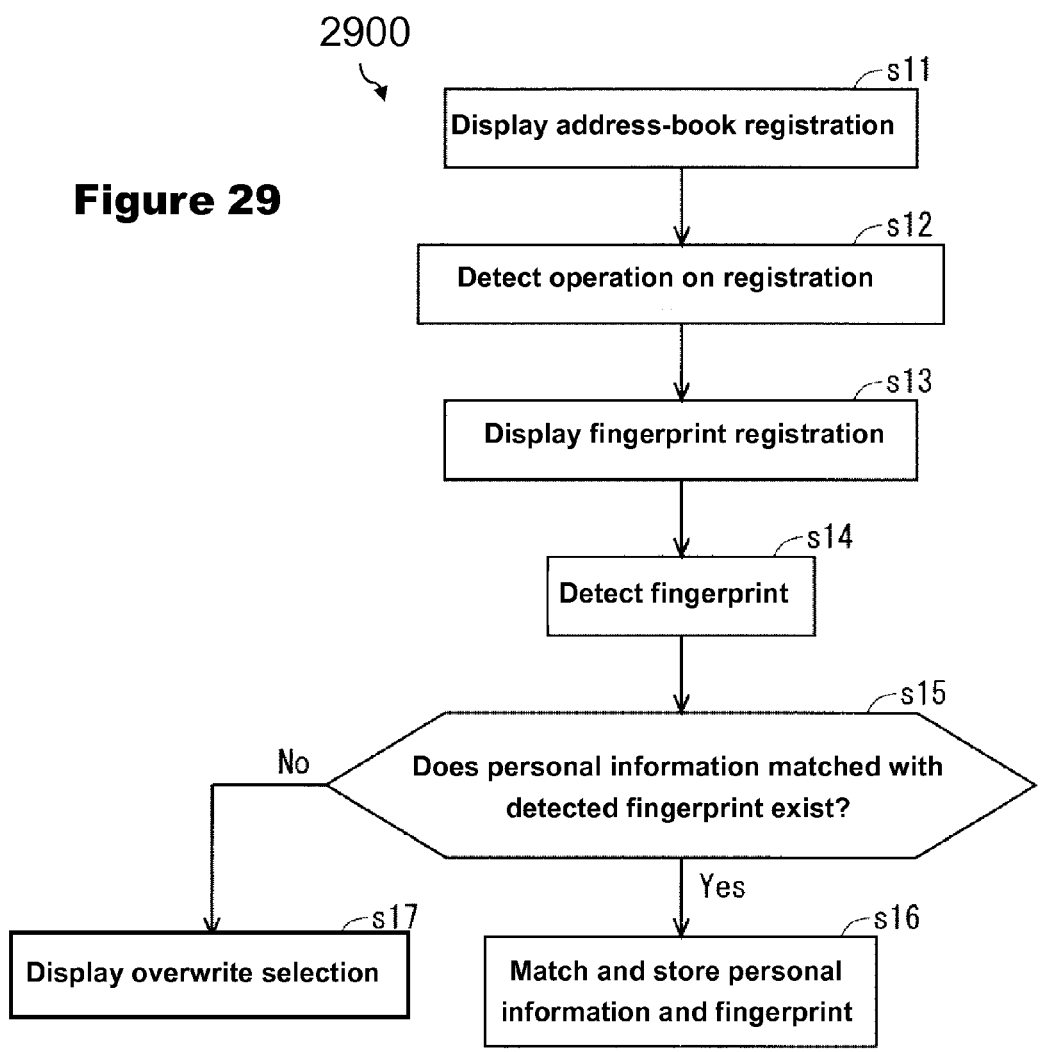
FIG. 29 is an illustration of an exemplary flowchart showing an address-book management program execution process according to an embodiment of the disclosure.

FIG. 29 is an illustration of a flowchart showing an address book management process 2900 suitable for use with the address book management program 521*h* (FIG. 4) according to an embodiment of the disclosure. The various tasks performed in connection with processes 2900 may be performed by software, hardware, firmware, a computer-readable medium having computer executable instructions for performing the process method, or any combination thereof. The processes 2900 may be recorded in a computer-readable medium such as a semiconductor memory, a magnetic disk, an optical disk, and the like, and can be accessed and executed, for example, by a computer CPU in which the computer-readable medium is stored. It should be appreciated that processes 2900 may include any number of additional or alternative tasks, the tasks shown in FIG. 29 need not be performed in the illustrated order, and processes 2900 may be incorporated into a more comprehensive procedure or process having additional functionality not described in detail herein. For illustrative purposes, the following description of processes 2900 may refer to elements mentioned above in connection with FIGS. 1-28. In practical embodiments, portions of processes 2900 may be performed by different elements of the mobile phone 1 for executing the address book management program, e.g., the wireless transceiver module 53, the control module 52, the storage module 52b, the touch panel 50, the operation module 51 etc. Process 2900 may have functions, material, and structures that are similar to the embodiments shown in FIGS. 1-28. Therefore common features, functions, and elements may not be redundantly described here.

When the user touches an application program icon being displayed on the touch panel 50 for starting the address book management program 521h with a finger, the operational-content determining module 524 determines that the operation detected on the touch panel 50 is an operation for starting the address book management program 521h and the CPU 52a executes the address book management program 521h. Then, in task S11, the address-book management module 531 controls the touch panel 50 via the display control module 522 and causes the touch panel 50 to display the address-book registration screen 210 (FIG. 30).

Process 2900 may then continue by the touch panel 50 detecting an operation using the registration button 210n in (task S12). Process 2900 may then continue by the address-book management module 531 causing the touch panel 50 to display a fingerprint registration screen 220 (task S13).

When the user touches the region 220a on the fingerprint registration screen 220 with a finger, the touch panel 50 detects the fingerprint of the finger in task S14. The process 2900 may then continue by, the address-book management module 531 determining whether personal information matched to the fingerprint detected by the touch panel 50 exists in the address book file 520a (inquiry task S15).

If the address-book management module 531 determines that personal information matched to the fingerprint detected by the touch panel 50 does not exist in the address book file 520a ("YES" branch of the inquiry task S15), the fingerprint detected on the touch panel 50 and the personal information input by the user are matched and stored (task S16) in the address book file 520a using the address-book registration screen 210.

On the other hand, the address-book management module 531 determines that personal information matched to the fingerprint detected by the touch panel 50 exists in the address book file 520a, ("NO" branch of the inquiry task S15), the address-book management module 531 causes the touch panel 50 to display an overwrite selection screen 230 (task S17) for selecting whether or not the personal information is to be overwritten with the personal information that is newly input by the user. If the touch panel 50 detects an activation of the permission button 230a (FIG. 32), the address-book management module 531 overwrites the personal information matched to the fingerprint detected by the touch panel 50 with the personal information that is newly input by the user. On the other hand, if the touch panel 50 detects an activation of the prohibition button 230b (FIG. 32), the address-book management module 531 causes the touch panel 50 to display the initial screen. In this way, the user may register fingerprints and personal information in the address book file 520a by matching personal information with each of a plurality of fingerprints of the user.

In this way, because the normal start or the information-designated start for an application program icon corresponding to an application program may be selected simply by changing an operation used to start the application program. The mobile phone 1 allows the user to easily select the normal start or the information-designated start of the application.

As a result of matching personal information of different persons with each of a plurality of fingerprints of the user's fingers respectively, the user may designate the personal information of different persons, even when starting the same application, simply by changing the finger used to carry out an information-designated start operation using an application program icon.

In this document, the terms "computer program product", "computer-readable medium", and the like may be used generally to refer to media such as, for example, memory, storage devices, or storage unit. These and other forms of computer-readable media may be involved in storing one or more instructions for use by the control module 52 to cause the control module 52 to perform specified operations. Such instructions, generally referred to as "computer program code" or "program code" (which may be grouped in the form of computer programs or other groupings), when executed, enable the method for operating an information device such as the mobile phone 1.

While at least one exemplary embodiment is presented in the foregoing detailed description, the present disclosure is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being comprised within the scope of the present disclosure as defined by the claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An information device comprising:
   a storage module operable to store:
     a first fingerprint corresponding to a first finger of a user, the first finger being any one of the five fingers of a hand of the user;
     a second fingerprint corresponding to a second finger of the user, the second finger being any one of the five fingers other than the first finger of the hand of the user;
     a first designated information associated with the first fingerprint; and
     a second designated information associated with the second fingerprint, the second designated information different from the first designated information;
   a touch panel operable to:
     display one or more icons;
     detect fingerprint information from a finger touching the touch panel to obtain a detected fingerprint information;
     detect an action of the finger touching a selected icon; and
   a control module operable to:
     execute an application program corresponding to the selected icon with using the first designated information to obtain a designated execution, if the detected fingerprint is associated with the first designated information and if the detection of action is an information-designated start operation, which is separate from detection of fingerprint information,
     execute an application program corresponding to the selected icon with using the second designated information to obtain a designated execution, if the detected fingerprint is associated with the second designated information and if the detection of action is an information-designated start operation, which is separate from detection of fingerprint information.

2. The information device according to claim 1, wherein the storage module further comprises personal information of a plurality of persons, wherein the designated information corresponds to the personal information of one of the persons.

3. The information device according to claim 1, wherein the control module is further operable to execute an application program corresponding to the selected icon without using the designated information to obtain a normal execution, if the action is a normal start operation.

4. The information device according to claim 3, wherein one of the information-designated start operation and the normal start operation, comprises touching the selected icon with the finger followed by the finger moving into a predetermined region of the touch panel while the finger is touching the touch panel.

5. The information device according to claim 4, wherein the predetermined region comprises an area of the touch panel outside a display region of the icons.

6. The information device according to claim 3, wherein one of the information-designated start operation and the normal start operation, comprises the finger touching the selected icon followed by the finger moving longer than a predetermined distance while the finger is touching the touch panel.

7. The information device according to claim 3, wherein one of the information-designated start operation and the normal start operation, comprises the finger touching the selected icon, followed by the finger moving faster than a predetermined speed while the finger is touching the touch panel.

8. The information device according to claim 3, wherein one of the information-designated start operation and the normal start operation, comprises the finger touching the selected icon, followed by the finger moving in a predetermined shape while the finger is touching the touch panel.

9. The information device according to claim 3, wherein:
   a first action comprises one of the information-designated start operation and the normal start operation; and
   a second action comprises one of the information-designated start operation and the normal start operation that is not the first action.

10. The information device according to claim 9, wherein:
    the first action comprises the finger touching the selected icon for a period of time longer than a predetermined period of time; and
    the second action comprises the finger touching the selected icon for a period of time shorter than the predetermined period of time.

11. The information device according to claim 9, wherein:
    the first action comprises the finger touching the selected icon for a period of time shorter than a predetermined period of time; and
    the second action comprises the finger touching the selected icon for a period of time longer than the predetermined period of time.

12. The information device according to claim 9, wherein:
    the first action comprises the finger touching the selected icon a plurality of times within a first predetermined period of time; and
    the second action comprises the finger touching the selected icon once within a second predetermined period of time.

13. The information device according to claim 9, wherein:
    the first action comprises the finger touching the selected icon once within a first predetermined period of time; and
    the second action comprises the finger touching the selected icon a plurality of times within a second predetermined period of time.

14. The information device according to claim 13, wherein:
    the first action and the second action comprise the finger moving within a predetermined region longer than a predetermined distance while the finger is touching the touch panel; and the control module is further operable to instruct the touch panel to display the selected icon at a destination of the finger, if the touch panel detects the finger moving outside the predetermined region while the finger is touching the touch panel.

15. The information device according to claim 1, wherein:
the touch panel is further operable to:
  display a first selection screen thereon; and
  detect a first permission to perform the designated execution; and
the control module is further operable to perform the designated execution, if the first permission is detected.

16. The information device according to claim 15, wherein:
the touch panel is further operable to:
  display thereon a second selection screen operable to approve the designated information; and
  detect a second permission from the user, if the first permission is detected; and
the control module is further operable to perform the designated execution, if the second permission is detected.

17. The information device according to claim 16, wherein:
the touch panel is further operable to:
  display thereon a third selection screen operable to permit the normal execution; and
  detect a third permission from the user, if the second action is detected; and
the control module is further operable to execute the application program without using the designated information, if the third permission is detected.

18. A method for operating an information device, the method comprising:
  obtaining first fingerprint information from a first user finger touching a touch panel;
  authenticating the first fingerprint information, if the first fingerprint information is associated with designated information stored in the information device;
  detecting an information-designated start operation of the first user finger touching a selected program icon displayed on the touch panel, said detecting step being separate from the obtaining step; and
  executing an application program corresponding to the selected program icon using the designated information, if the first fingerprint information is authenticated;
  obtaining second fingerprint information from a second user finger, which is different than the first user finger, touching a touch panel;
  authenticating the second fingerprint information, if the second fingerprint information is associated with designated information stored in the information device;
  detecting an information-designated start operation of the second user finger touching a selected program icon displayed on the touch panel, said detecting step being separate from the obtaining step; and
  executing an application program corresponding to the selected program icon using the designated information, if the second fingerprint information is authenticated.

19. The method according to claim 18, further comprising:
  detecting a normal start operation of the user finger using the touch panel; and
  executing the application program corresponding to the selected program icon without using the designated information.

20. A non-transitory computer readable medium having computer-executable instructions stored thereon for: comprising obtaining first fingerprint information from a first user finger touching a touch panel;
  authenticating the first fingerprint information, if the first fingerprint information is associated with designated information stored in the information device;
  detecting an information-designated start operation of the first user finger touching a selected program icon displayed on the touch panel, said detecting step being separate from the obtaining step; and
  executing an application program corresponding to the selected program icon using the designated information, if the first fingerprint information is authenticated;
  obtaining second fingerprint information from a second user finger, which is different than the first user finger, touching a touch panel;
  authenticating the second fingerprint information, if the second fingerprint information is associated with designated information stored in the information device;
  detecting an information-designated start operation of the second user finger touching a selected program icon displayed on the touch panel, said detecting step being separate from the obtaining step; and
  executing an application program corresponding to the selected program icon using the designated information, if the second fingerprint information is authenticated.

21. The non-transitory computer readable medium according to claim 20, having computer-executable instructions stored thereon for: further comprising program code comprising:
  detecting a normal start operation of the user finger using the touch panel; and
  executing the application program corresponding to the selected program icon without using the designated information.

* * * * *